(12) United States Patent
Kusakawa et al.

(10) Patent No.: US 8,600,052 B2
(45) Date of Patent: Dec. 3, 2013

(54) KEY GENERATION DEVICE, ENCRYPTION DEVICE, RECEPTION DEVICE, KEY GENERATION METHOD, KEY PROCESSING METHOD, AND PROGRAM

(75) Inventors: Masafumi Kusakawa, Tokyo (JP); Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1101 days.

(21) Appl. No.: 12/447,872

(22) PCT Filed: Aug. 17, 2007

(86) PCT No.: PCT/JP2007/066002
§ 371 (c)(1),
(2), (4) Date: Apr. 29, 2009

(87) PCT Pub. No.: WO2008/053629
PCT Pub. Date: May 8, 2008

(65) Prior Publication Data
US 2010/0067702 A1    Mar. 18, 2010

(30) Foreign Application Priority Data
Oct. 30, 2006    (JP) ................... P2006-294639

(51) Int. Cl.
*H04L 9/08*    (2006.01)

(52) U.S. Cl.
USPC ..................... 380/45; 380/278; 380/279

(58) Field of Classification Search
None
See application file for complete search history.

(56) References Cited

U.S. PATENT DOCUMENTS

| | | | | |
|---|---|---|---|---|
| 7,010,125 B2 * | 3/2006 | Lotspiech et al. | ............ | 380/242 |
| 7,096,356 B1 * | 8/2006 | Chen et al. | ................. | 713/163 |
| 2002/0114466 A1 * | 8/2002 | Tanaka et al. | ................. | 380/232 |
| 2003/0185399 A1 * | 10/2003 | Ishiguro | ................. | 380/281 |
| 2005/0169481 A1 * | 8/2005 | Han et al. | ................. | 380/277 |
| 2005/0201559 A1 | 9/2005 | Van Der Heijden | | |
| 2006/0078110 A1 * | 4/2006 | Kim et al. | ................. | 380/30 |
| 2006/0129805 A1 * | 6/2006 | Kim et al. | ................. | 713/158 |
| 2007/0016769 A1 * | 1/2007 | Gentry et al. | ................. | 713/163 |
| 2007/0079118 A1 * | 4/2007 | Chmora et al. | ................. | 713/163 |
| 2007/0174609 A1 * | 7/2007 | Han et al. | ................. | 713/167 |
| 2008/0085005 A1 * | 4/2008 | Jung et al. | ................. | 380/282 |

FOREIGN PATENT DOCUMENTS

| | | |
|---|---|---|
| JP | 2004-520743 | 7/2004 |
| JP | 2005-526453 | 9/2005 |
| WO | WO 02/060116 A2 | 8/2002 |

OTHER PUBLICATIONS

J. Horwitz, "A Survey of Broadcast Encryption," Journal of ACM, Jan. 13, 2003.*

N. Attrapadung, et al. "Sequential Key Derivation Patterns for Broadcast Encryption and Key Predistribution Schemes," ASIACRYPT 2003, pp. 374-391.*

(Continued)

*Primary Examiner* — Jung Kim
*Assistant Examiner* — Robert Leung
(74) *Attorney, Agent, or Firm* — Finnegan, Henderson, Farabow, Garrett & Dunner, L.L.P.

(57) ABSTRACT

A key generation device according to the present invention hierarchically constructs a Y-ary tree structure where n reception devices are assigned to leaves, and forms subgroups where individual intermediate nodes existing between the leaves and a root of the Y-ary tree structure are defined as parent nodes. By providing new parameters to the individual intermediate parameters, the subgroups can be formed flexibly. In a case where no excluded customer exists or the number of excluded customers is small, the size of a header to be delivered and the calculation amount of an operation that a customer needs to perform can be reduced.

22 Claims, 26 Drawing Sheets

(56) References Cited

OTHER PUBLICATIONS

N. Jho, et al. "One-Way chain based broadcast encryption schemes," EUROCRYPT'05, 2005, pp. 559-574.*

Yevgeniy Dodis et al., "*Public Key Broadcast Encryption for Stateless Receivers*", Courant Institute of Mathematical Sciences, New York University, DRM 2002, Lecture Notes in Computer Science, vol. 2696, pp. 61-80 (2003).

Boneh, Dan et al., "*Collusion Resistant Broadcast Encryption With Short Ciphertexts and Private Keys*, Lecture Notes in Computer Science, vol. 3621, pp. 258-275 (2005)".

Translation of Written Opinion of the International Searching Authority in International Application No. PCT/JP2007/066002, mailed May 14, 2009.

* cited by examiner

CASE OF n = 64

CASE OF n = 64

CASE OF n = 64

KEY GENERATION DEVICE, ENCRYPTION DEVICE, RECEPTION DEVICE, KEY GENERATION METHOD, KEY PROCESSING METHOD, AND PROGRAM

TECHNICAL FIELD

The present invention relates to a key generation device, an encryption device, a reception device, a key generation method, an encryption method, a key processing method, and a program.

BACKGROUND ART

In recent years, due to the widespread use and development of not only personal computers (PCs) but also portable telephones, digital home electric appliances, and the like, content delivery businesses for music, images, and the like have been becoming increasingly important. As a content delivery business, for example, paid broadcasting using cable television, satellite broadcasting, or the Internet, selling of content using physical media such as CDs or DVDs, and the like exist. In any of these cases, it is necessary to configure a mechanism in which only a customer can acquire content.

Normally, in such a content delivery system, an administrator (hereinafter, referred to as a center) of the system supplies a key only to a customer in advance, and at the time of delivery of content, delivers ciphertext C, which has been generated by encrypting content M by using a session key s, and a header h for allowing only the customer to acquire the session key s. Accordingly, only the customer can acquire the content M.

As a content delivery method for realizing the above-described situation, for example, a method using a public key is available (see, for example, non-patent document 1).

Non-Patent Document 1: D. Boneh, C. Gentry, B. Waters, "Collusion Resistant Broadcast Encryption With Short Ciphertexts and Private Keys", CRYPTO'05, Proceedings of 25th Annual International Cryptology Conference on Advances in Cryptology, London, UK, Springer Verlag, 2005, pp. 58-75.

DISCLOSURE OF INVENTION

Technical Problem

However, in the public-key encryption method described in the above-mentioned non-patent document 1, even in a case where the number of excluded customers for which delivery is eliminated is small, it is necessary to always deliver a header h of a constant size. Thus, under a real possible situation such as a case where the number of excluded customers is zero or a case where the percentage of the number of excluded customers relative to the total number of customers is small, the header size cannot be reduced. Therefore, a problem exists in that data redundancy at the time of delivery of encrypted content is increased.

Thus, in view of the above-described problem, the present invention has been made. An object of the present invention is to provide a novel and improved key generation device, encryption device, reception device, key generation method, encryption method, key processing method, and program capable of reducing a header size even in a case where the number of excluded customers is small.

Technical Solution

In order to achieve the above-mentioned object, according to a first aspect of the present invention, there is provided a key generation device including a tree-structure construction unit that hierarchically constructs a Y-ary tree structure where n reception devices are assigned to leaves and a height is represented by ($\log_Y n$), and forms subgroups constituted by a plurality of leaves existing in a layer lower than intermediate nodes existing between the leaves and a root; a leaf-key assigning unit that assigns leaf keys $g_y$ to the individual leaves and the individual intermediate nodes; a parameter assigning unit that assigns different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and a key calculation unit that identifies paths extending from the root to the leaves, and calculates keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

The key generation device described above may be configured so as to further include a delivery unit that delivers sets of keys in the paths calculated by the key calculation unit to the respective reception devices.

The key generation device described above may further include a random-number determination unit that selects, at random, a prime p to determine a bilinear group G having the prime p as an order, selects, at random, g serving as a generator of G, and selects, at random, a secret random number α (α is an integer). The leaf-key assigning unit described above may calculate the leaf keys $g_y$ that satisfy expression A below. Here, in expression A below, y=1, 2, ... Y, Y+2, ..., 2Y is set.

[Math. 1]

$$g_y = g^{(\alpha)^y} \quad \text{(Expression A)}$$

The parameter assigning unit described above may select, at random, for the root and all the individual nodes except for the leaves, the node parameters $\gamma_{x,y}$ ($\gamma_{x,y}$ is an integer), and may calculate the parameters $v_{x,y}$ shown in expression B below.

[Math. 2]

$$v_{x,y} = g^{(\gamma_{x,y})} \quad \text{(Expression B)}$$

The key calculation unit may set, as secret keys, values obtained by raising the leaf keys $g_y$ assigned to the intermediate nodes or the leaves to the power of the parameters $\gamma_{x,y}$ assigned to parent nodes of the intermediate nodes or the leaves. That is, in a case where a leaf key $g_y$ assigned to an intermediate node or a leaf is abbreviated as K and a parameter $\gamma_{x,y}$ assigned to a parent node of the intermediate node or the leaf is abbreviated as T, a value obtained by $K^T$ may be set to a secret key.

The key calculation unit described above may calculate a public key on the basis of the leaf keys $g_y$ and the parameters $v_{x,y}$. The delivery unit described above may include a public-key publishing part that publishes the public key.

The delivery unit described above may further include a transmission part that transmits the secret keys calculated by the key calculation unit to the respective reception devices.

In order to achieve the above-mentioned object, according to a second aspect of the present invention, there is provided an encryption device including an excluded reception device identification unit that identifies an excluded reception device among n reception devices, and determines a set S of non-excluded reception devices.

The encryption device described above may further include a session-key determination unit that selects, at random, an integer t, and determines a session key $s = e(g_Y, g_1)^t$.

Here, $e(g_Y, g_1)$ described above represents a bilinear map for two elements $g_y$ and $g_1$ of a bilinear group.

The encryption device described above may further include an encryption unit that encrypts, by using the above-described session key s, content to be delivered.

In a hierarchized tree structure, the session-key determination unit described above may further include a header-element calculation part that marks all the individual nodes existing in a path extending from a leaf for the excluded reception device to the root, and calculates, on the basis of the parameters $v_{x,y}$ assigned to the marked nodes and leaf keys $g_y$ assigned to intermediate nodes for which the marked nodes serve as parent nodes, header elements by using expression C below. Here, $S_{x,y}$ represents a set of unmarked child nodes belonging to each of subgroups where the marked nodes serve as parent nodes.

[Math. 3]

$$c_{x,y} = \left( v_{x,y} \cdot \prod_{j \in S_{x,y}} g_{Y+1-j} \right)^t \quad \text{(Expression C)}$$

The session-key determination unit described above may further include a header information generation part that sets $c_{x,y}$ and $g^t$ obtained by the header-element calculation part as header information.

In order to achieve the above-mentioned object, according to a third aspect of the present invention, there is provided a reception device capable of communicating with a key generation device and an encryption device, including a reception unit that receives keys obtained by the key generation device that hierarchically constructs a Y-ary tree structure where n reception devices are assigned to leaves and a height is represented by ($\log_Y n$), forms subgroups constituted by a plurality of leaves existing in a layer lower than intermediate nodes existing between the leaves and a root, assigns leaf keys $g_y$ to the individual leaves and the individual intermediate nodes, assigns different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifies paths extending from the root to the leaves, and calculates the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

The reception device described above may further include a decryption unit that decrypts encrypted content by using a session key s.

The reception unit described above may further receive information on a set S of non-excluded reception devices, which is information for identifying an excluded reception device. The reception device described above may further include a determination unit that determines whether or not the reception device is included in the set S.

In a case where the determination unit determines that the reception device described above is included in the set S, the decryption unit described above may decrypt the encrypted content by calculating the session key s on the basis of expression D below and using the calculated session key s.

[Math. 4]

$$s = \frac{e(g_{i_{x'}}, c_{x,y})}{e\left( g_{i_{x'}}^{\gamma_{i_{x'}} - 1} \cdot \prod_{\substack{j \in S_{x,y} \\ j \neq i_{x'}}} g_{Y+1-j+i_{x'}}, g^t \right)} \quad \text{(Expression D)}$$

In order to achieve the above-mentioned object, according to a fourth aspect of the present invention, there is provided a key generation method including a tree-structure construction step of hierarchically constructing a Y-ary tree structure where n reception devices are assigned to leaves and a height is represented by ($\log_Y n$), and forming subgroups constituted by a plurality of leaves existing in a layer lower than intermediate nodes existing between the leaves and a root; a leaf-key assigning step of assigning leaf keys $g_y$ to the individual leaves and the individual intermediate nodes; a parameter assigning step of assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and a key calculation step of identifying paths extending from the root to the leaves, and calculating keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

In order to achieve the above-mentioned object, according to a fifth aspect of the present invention, there is provided an encryption method including an excluded reception device identification step of identifying an excluded reception device among n reception devices, and determining a set S of non-excluded reception devices.

In order to achieve the above-mentioned object, according to a sixth aspect of the present invention, there is provided a key processing method including a step of receiving keys obtained by hierarchically constructing a Y-ary tree structure where n reception devices are assigned to leaves and a height is represented by ($\log_Y n$), forming subgroups constituted by a plurality of leaves existing in a layer lower than intermediate nodes existing between the leaves and a root, assigning leaf keys $g_y$ to the individual leaves and the individual intermediate nodes, assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifying paths extending from the root to the leaves, and calculating the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

In order to achieve the above-mentioned object, according to a seventh aspect of the present invention, there is provided a program for causing a computer to realize a tree-structure construction function of hierarchically constructing a Y-ary tree structure where n reception devices are assigned to leaves and a height is represented by ($\log_Y n$), and forming subgroups constituted by a plurality of leaves existing in a layer lower than intermediate nodes existing between the leaves and a root; a leaf-key assigning function of assigning leaf keys $g_y$ to the individual leaves and the individual intermediate nodes; a parameter assigning function of assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and a key calculation function of identifying paths extending from the root to the leaves, and calculating keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

With this configuration, by being stored in a storage unit provided in the computer and being read and executed by a CPU provided in the computer, the computer program causes the computer to function as the key generation device described above. In addition, a computer-readable recording medium having the computer program recorded thereon can also be provided. The recording medium is, for example, a magnetic disk, an optical disk, a magneto-optical disk, a flash memory, or the like. In addition, the computer program described above may be delivered via, for example, a network, without using the recording medium.

In order to achieve the above-mentioned object, according to an eighth aspect of the present invention, there is provided a program for causing a computer to realize an excluded reception device identification function of identifying an excluded reception device among n reception devices and determining a set S of non-excluded reception devices.

With this configuration, by being stored in a storage unit provided in the computer and being read and executed by a CPU provided in the computer, the computer program causes the computer to function as the encryption device described above. In addition, a computer-readable recording medium having the computer program recorded thereon can also be provided. The recording medium is, for example, a magnetic disk, an optical disk, a magneto-optical disk, a flash memory, or the like. In addition, the computer program described above may be delivered via, for example, a network, without using the recording medium.

In order to achieve the above-mentioned object, according to a ninth aspect of the present invention, there is provided a program for causing a computer to realize a reception function of receiving encryption keys obtained by hierarchically constructing a Y-ary tree structure where n reception devices are assigned to leaves and a height is represented by $(\log_Y n)$, forming subgroups constituted by a plurality of leaves existing in a layer lower than intermediate nodes existing between the leaves and a root, assigning leaf keys $g_y$ to the individual leaves and the individual intermediate nodes, assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifying paths extending from the root to the leaves, and calculating the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

With this configuration, by being stored in a storage unit provided in the computer and being read and executed by a CPU provided in the computer, the computer program causes the computer to function as the reception device described above. In addition, a computer-readable recording medium having the computer program recorded thereon can also be provided. The recording medium is, for example, a magnetic disk, an optical disk, a magneto-optical disk, a flash memory, or the like. In addition, the computer program described above may be delivered via, for example, a network, without using the recording medium.

Advantageous Effects

According to the present invention, even in a case where the number of excluded customers is small, a header size can be reduced.

BEST MODE FOR CARRYING OUT THE INVENTION

Hereinafter, a preferred embodiment of the present invention will be described in detail with reference to the attached drawings. Note that in the specification and drawings, by providing components having substantially the same functional configuration with the same sign, a redundant explanation will be omitted.

(First Embodiment)

Hereinafter, an encryption key delivery system according to a first embodiment of the present invention will be described in detail.

Figure 1:
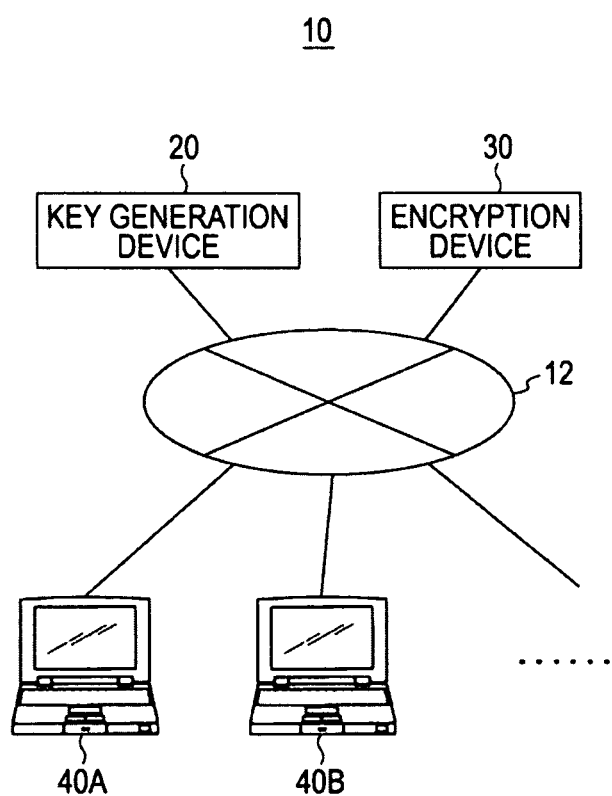
FIG. 1 is an explanatory diagram for explaining an encryption key generation system according to a preferred embodiment of the present invention.

FIG. 1 is an explanatory diagram showing an encryption key delivery system 10 according to this embodiment. The encryption key delivery system 10 includes, for example, a communication network 12, a key generation device 20, an encryption device 30, a reception device 40A, and a reception device 40B.

The communication network 12 is a communication line network for connecting the key generation device 20, the encryption device 30, and the reception devices 40 so that bidirectional communication or one-way communication can be realized. This communication network is constituted by, for example, a public line network, such as the Internet, a telephone network, a satellite communication network, or a broadcast communication channel, a dedicated line network, such as a WAN (Wide Area Network), a LAN (Local Area Network), an IP-VPN (Internet Protocol-Virtual Private Network), or a wireless LAN, or the like. This communication network may be wired or wireless.

The key generation device 20 generates a public key and a secret key unique to each of a plurality of reception devices. The key generation device 20 publishes the public key, and delivers the individual secret keys to the respective reception devices via secure communication channels. Note that the key generation device 20 is owned by a center that performs generation and management of the public key and the secret keys.

The encryption device 30 encrypts any content by using the public key generated and published by the key generation device 20, and delivers the encrypted content to each of the reception devices via the communication network 12. The encryption device 30 can be owned by any third party. In addition, the encryption device 30 can be owned by an owner of the key generation device 20 or owners of the reception devices 40.

The reception devices 40 are each capable of decrypting, by using a unique secret key, the encrypted content delivered from the encryption device 30 and of using the decrypted content. Note that the reception device 40A and the reception device 40B can be connected to each other via the communication network 12 or a wire. Note that the reception devices 40 are owned by individual customers.

Note that although computer devices (irrespective of whether notebook-type devices or desktop-type devices), such as personal computers (Personal Computers: PCs), are shown as the reception devices 40 in the illustrated example, the reception devices 40 are not limited to this example. As long as the reception devices 40 are devices having a communication function via a network, they can be configured as, for example, information appliances, such as PDAs (Personal Digital Assistants), home-use game machines, DVD/HDD recorders, or television receivers, tuners or decoders for television broadcasting, or the like. Alternatively, the reception devices 40 may be portable devices (Portable Devices) that can be carried by customers, such as, for example, portable game machines, portable telephones, portable video/audio players, PDAs, or PHSs.

Next, the hardware configuration of the key generation device 20 according to this embodiment will be briefly explained with reference to FIG. 2.

Figure 2:
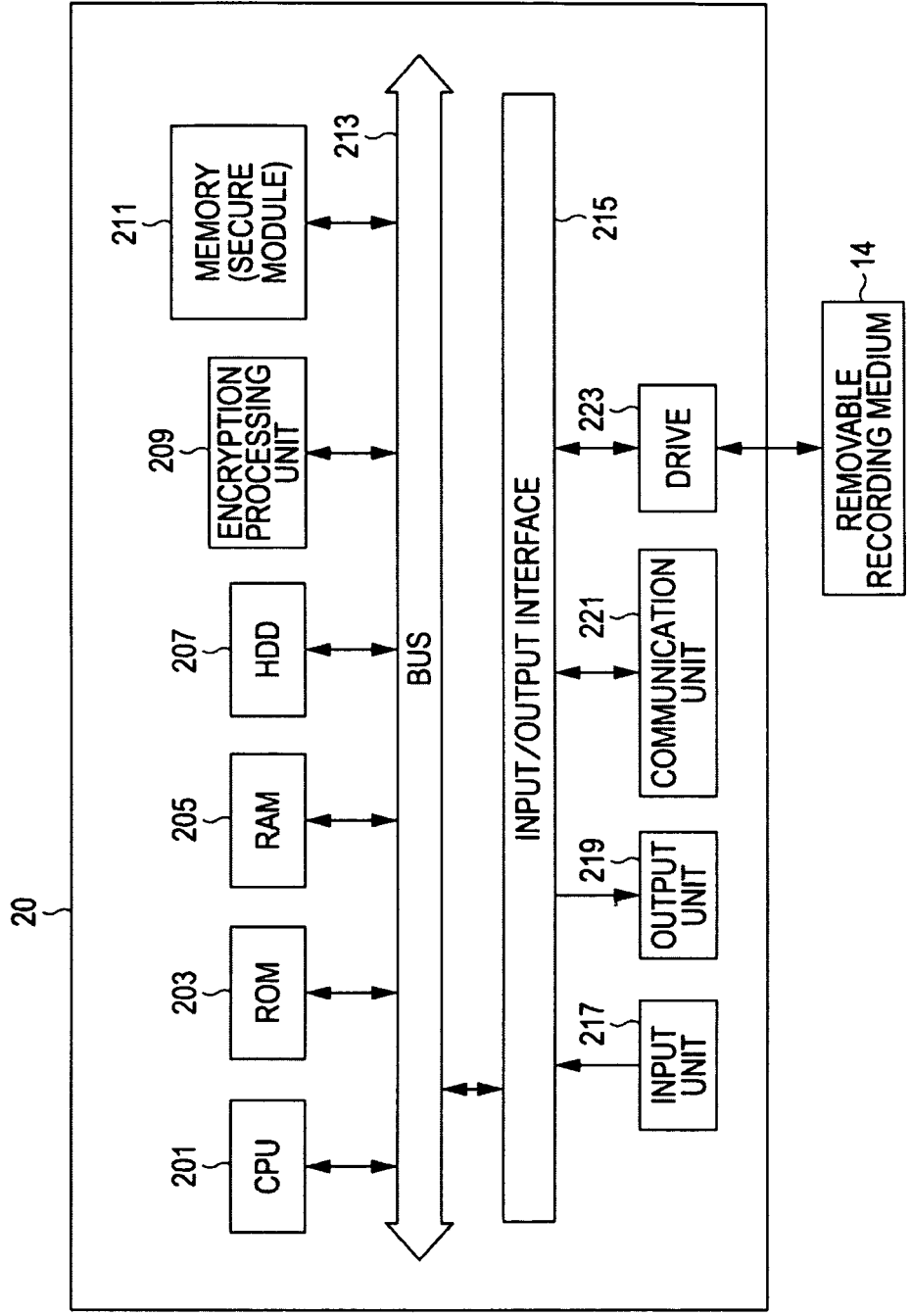
FIG. 2 is a block diagram for explaining the hardware configuration of a key generation device according to the embodiment.

FIG. 2 is a block diagram showing the hardware configuration of the key generation device 20. The key generation device 20 includes, for example, a CPU (Central Processing Unit) 201, a ROM (Read Only Memory) 203, a RAM (Random Access Memory) 205, an HDD (Hard Disk Drive) 207, an encryption processing unit 209, and a memory (secure module) 211.

The CPU 201 functions as an arithmetic processing device and a control device. The CPU 201 controls general operations within the key generation device 20 in accordance with various programs. The ROM 203 stores programs, arithmetic parameters, and the like used by the CPU 201. The RAM 205 temporarily stores a program used in the performance of the CPU 201, a parameter changing appropriately in the execution of the program, and the like.

The HDD 207 is a device for data storage configured as an example of a storage unit of the key generation device 20 according to this embodiment. The HDD 207 drives a hard disk and stores programs executed by the CPU 201 and various data. The encryption processing unit 209 performs various types of encryption processing performed by the key generation device 20 according to this embodiment under the control of the CPU 201. The memory (secure module) 211 securely stores information that needs to be concealed, such as a private secret key and a center-secret random number, mainly. Information stored inside the memory 211 has a characteristic in that the information cannot be referred to from the outside. In addition, the memory (secure module) 211 may be constituted by, for example, a storage device having a tamper-resistant property. Note that although a description indicating that the secure module is a memory is provided, the secure module according to the present invention is not limited to a memory. The secure module may be, for example, a magnetic disk, an optical disk, or a magneto-optical disk. Alternatively, the secure module may be a storage medium, such as a semiconductor memory.

The CPU 201, the ROM 203, the RAM 205, the HDD 207, the encryption processing unit 209, and the memory 211 are connected to each other via a bus 213 constituted by a CPU bus or the like.

The bus 213 is connected to an input/output interface 215, such as a PCI (Peripheral Component Interconnect/Interface) bus, via a bridge.

An input unit 217 is constituted by, for example, operation means, such as a mouse, a keyboard, a touch panel, a button, a switch, and a lever, operated by a user, an input control circuit for generating an input signal on the basis of the operation by the user and outputting the input signal to the CPU 201, and the like. By operating the input unit 217, the user of the key generation device 20 is able to input various data to the key generation device 20 and to instruct the key generation device 20 to perform a processing operation.

An output unit 219 is constituted by, for example, a display device, such as a CRT (Cathode Ray Tube) display device or a liquid crystal display (LCD) device and a lamp, an audio output device, such as a speaker and a headphone, and the like. The output unit 219 is capable of, for example, outputting reproduced content. Specifically, the display device displays, in the form of text or images, various types of information such as reproduced video data. Meanwhile, the audio output device converts reproduced music data or the like into sound and outputs the sound.

A communication unit 221 is a communication interface constituted by, for example, a communication device and the like for allowing connection to the communication network 12. The communication unit 221 transmits and receives various data, such as information on an encryption key and content information, to and from, for example, the encryption device 30 and the reception devices 40A and 40B, via the communication network 12.

A drive 223 is a reader/writer for a storage medium. The drive 223 is contained in the key generation device 20 or provided externally. The drive 223 reads information recorded on a removable recording medium 14 loaded, such as a magnetic disk, an optical disk, a magneto-optical disk, or a semiconductor memory, and outputs the information to the RAM 205.

Note that since the hardware configurations of the encryption device 30 and the reception devices 40 are substantially the same as the hardware configuration of the key generation device 20, the description of the hardware configurations of the encryption device 30 and the reception devices 40 will be omitted.

In the above, an example of the hardware configuration capable of implementing functions of the key generation device 20, the encryption device 30, and the reception devices 40 according to this embodiment has been described. Each of the above-described components may be constituted by a general-purpose member or may be constituted by hardware specialized for a function of the component. Thus, a hardware configuration to be used can be changed in an appropriate manner in accordance with the technical level on each occasion of implementation of this embodiment. In addition, it is obvious that the above-described hardware configuration is merely an example and the present invention is not limited to this. For example, the HDD 207 and the memory (secure module) 211 may be constituted by the same storage device. In addition, depending on the manner of use, a configuration in which the bus 213, the input/output interface 215, or the like is omitted may be available. Hereinafter, an encryption key generation method that can be realized with the hardware configuration described above will be described in detail.

Explanation on Fundamental Technology

First, before providing a detailed description of a preferred embodiment of the present invention, technical matters that form the basis for realizing the embodiment will be described. Note that by improvement on the fundamental technology described below, the embodiment is formed in such a manner that more remarkable effects can be achieved. Thus, the technology relating to the improvement is the very part that forms features of the embodiment. That is, it should be noted that although the embodiment follows the basic concept of the technical matters described here, the very nature of the embodiment is rather summarized in the improved part, the configuration of the embodiment is clearly different from that of the fundamental technology, and in addition, the line is drawn between the embodiment and the fundamental technology in terms of advantages.

In a conventional content delivery method using a public key, a center determines a system parameter k of a content delivery system and forms a kth-order center-secret polynomial based on the system parameter k. After that, by using the kth-order secret polynomial, the center generates a public key PK and a secret key $d_i$ (hereinafter, referred to as a private secret key) unique to a customer i. The center publishes the public key PK and delivers the private secret key $d_i$ to the customer i by using a secure communication channel. In addition, at the time of delivery of content, the center delivers ciphertext C and a header h. Since the header h is generated by using the public key PK, any deliverer can generate the header h. In the conventional content delivery method using a public key, a customer i should keep only one secret key $d_i$. In addition, since the public key PK is published, a deliverer who is not the center is able to deliver content.

However, in order to generate a private secret key, the kth-order polynomial based on k, which is a security parameter, is used. A collusion problem has existed in that in a case where k+1 or more customers collude with each other, the security of the system cannot be maintained.

Thus, in non-patent document 1 mentioned above, a public key content delivery method is suggested in which even in a case where any number of customers collude with each other, the security of the system can be maintained.

In the method described in non-patent document 1 by Boneh, Gentry, Waters, et al., a private secret key is generated by using a type of cyclic multiplicative group called a bilinear group, not using a kth-order polynomial, and an element unique to a customer i in the group is provided as a private secret key $d_i$. In addition, by using an operation called bilinear mapping for generation of a header h and acquisition of a session key s by each customer, the collusion problem, which has been a big problem in the conventional content delivery system using a public key, can be solved.

Figure 3:
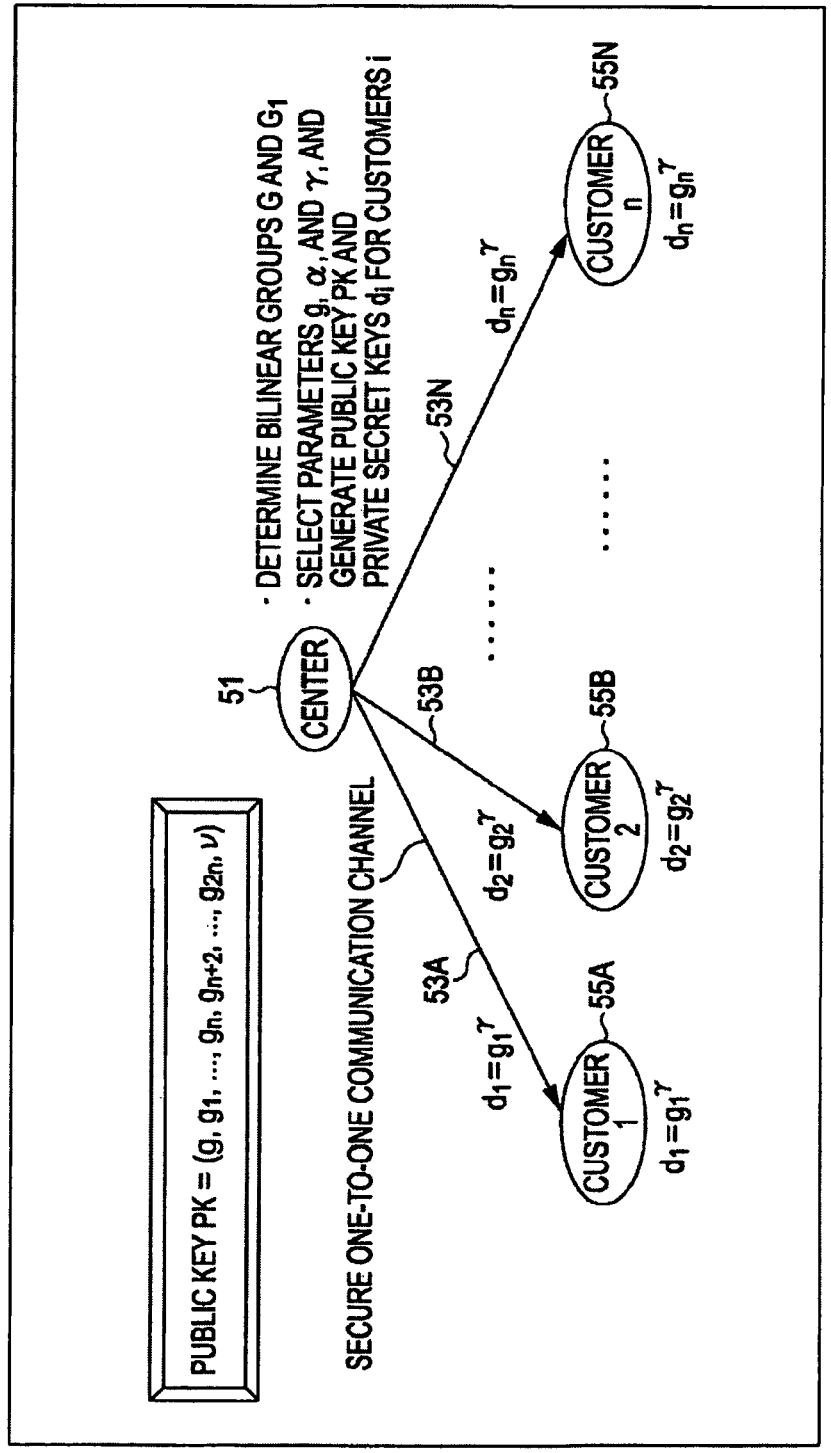
FIG. 3 is an explanatory diagram for explaining the overview of key generation according to a basic method of a fundamental technology of the present invention.

In non-patent document 1, first, as a basic method, a method for handling a set of customers as one group is described. Hereinafter, this basic method will be described with reference to FIG. 3. In this basic method, a center 51 generates a generator g of a bilinear group and center-secret α, and assigns, by using them, to a customer i (i=1, ... n) the following parameter:

$$g_i = g^{\alpha^i} \quad \text{[Math. 5]}$$

In addition, a parameter $v = g^\gamma$ for handling a set of customers 55 as one group is generated, and the generator g and the parameter v are published as a public key PK=(g, $g_1, \ldots, g_n, g_{n+2}, \ldots, g_{2n}$, v). Furthermore, to a customer i, by using the following parameter:

$$g_i = g^{\alpha^i} \quad \text{[Math. 6]}$$

assigned to i, the following private secret key:

$$d_i = g_i^\gamma \quad \text{[Math. 7]}$$

is supplied in advance via a secure one-to-one communication channel 53.

A deliverer creates, from the public key PK=(g, $g_1, \ldots, g_n, g_{n+2}, \ldots, g_{2n}$, v), in accordance with the following parameter:

$$g_i = g^{\alpha^i} \quad \text{[Math. 8]}$$

assigned to all the non-excluded customers and the parameter $v = g^\gamma$ for handling a set of customers as one group, a common header element corresponding to all the non-excluded customers. Then, the deliverer generates the header h by using header elements including the common header element and a random-number element used at the time of generation of a session key, and delivers the header h together with ciphertext C.

As described above, in the basic method, by handling a set of customers as one group and forming a header element corresponding to the group, the size of the header h (hereinafter, referred to as a header size) is minimized.

However, since all the customers are handled as one group, different parameters $g_1, \ldots, g_n$ need to be assigned to individual customers. Thus, the size of a public key is equal to or more than twice the number of customers. In addition, in a case where each customer acquires a session key s from a header h, the product of parameters $g_1, \ldots, g_n$ corresponding to all the non-excluded customers other than the customer needs to be calculated. Thus, if the value of n, which represents the total number of customers, is very large, the burden imposed on the customer in terms of the amount of calculation is very large. In the realistic content delivery, content needs to be delivered to a significantly large number of customers via paid broadcasting, a physical medium such as a DVD, the Internet, or the like. Thus, taking into consideration the problem described above, it can be said that the basic method cannot be used realistically.

As a method for solving the problem described above, in non-patent document 1, a generalization method is suggested in which the size of a public key can be reduced by dividing a set of customers into a plurality of subgroups. In the generalization method, a set of customers is divided into a plurality of subgroups and an operation as in the basic method is performed on each of the divided subgroups. Thus, different header elements need to be generated for individual subgroups and the header size is increased. However, the size of a public key can be reduced. In addition, each customer needs to calculate the product of parameters assigned to individual customers belonging to a divided subgroup. However, compared with the basic method, since a set of customers is divided into subgroups, the number of parameters that need to be calculated can be reduced. Thus, the problem in the basic method can be solved.

Hereinafter, the generalization method described in non-patent document 1 will be described in detail with reference to FIGS. 4 to 8. First, signs necessary for explanation of the generalization method mentioned above are defined, and a bilinear group and a bilinear map used in non-patent document 1 will be described. Then, by using the definitions, details, problems, and the like of the generalization described in non-patent document 1 will be described.

<Definition of Signs>

Each sign used for explanation of the generalization method described in non-patent document 1 will be defined as listed below.

n: the total number of customers
A: the number of divisions when a customer group is divided into a plurality of subgroups
B: the number of customers belonging to a divided subgroup
PK: a public key of the system
$d_i$: a private secret key of an ith customer
r: the total number of excluded customers
p: a large prime serving as the order of a bilinear group
G, $G_1$: a bilinear group having an order p
g: a generator of G
M: unencrypted content (plaintext)
s: a session key
C: ciphertext obtained by encrypting plaintext M using a session key s
$E_s(M)$: encryption of plaintext M by using a key s
$D_s(C)$: decryption of ciphertext C by using a key s
e(u,v): a bilinear map with respect to two elements u and v of a bilinear group G <Bilinear Map of Bilinear Group>

Now, a bilinear map of a bilinear group used in non-patent document 1 will be described. A bilinear map e(u,v) is a map where two elements u and v of a cyclic multiplicative group G are mapped into elements of a cyclic multiplicative group $G_1$ and meets the properties listed below.

1. Bilinear property: for any u,v ∈ G and a,b ∈ Z, e ($u^a$, $v^b$)=e(u, v)$^{ab}$ is met.
2. Non-degenerate property: e(g,g)≠1.

Now, regarding the generalization method described in non-patent document 1, each step will be described in detail. This generalization method is constituted by mainly three phases, a key generation phase, an encryption phase, and a decryption phase. The key generation phase is performed only once by the center at the time of configuration of the system. The encryption phase and the decryption phase are performed by a deliverer and a customer, respectively, every time delivery is carried out. Hereinafter, each phase will be described.

<Key Generation Phase>

Figure 4:
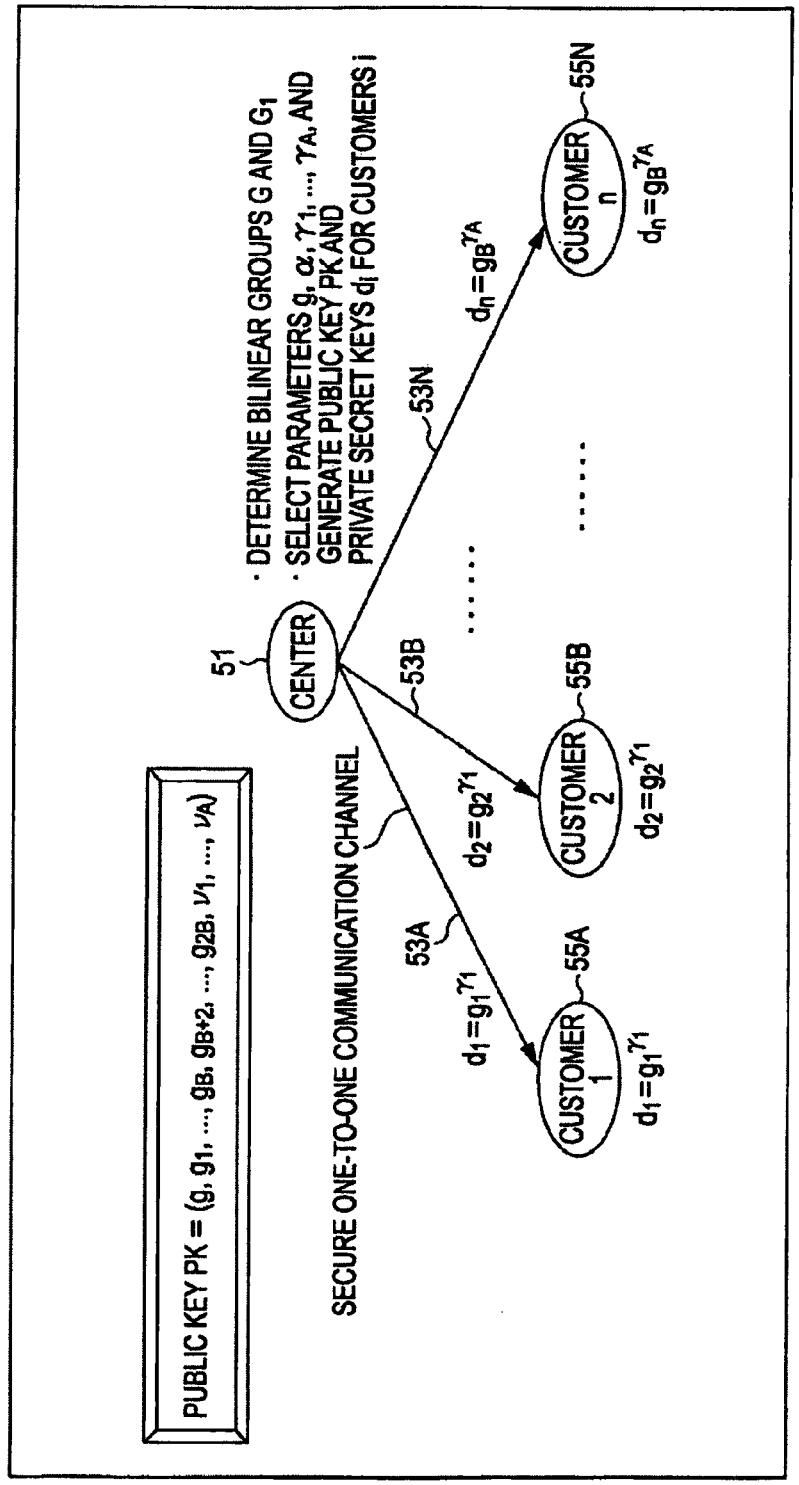
FIG. 4 is a flowchart for explaining the overview of key generation according to a generalization method of the fundamental technology of the present invention.
Figure 5:
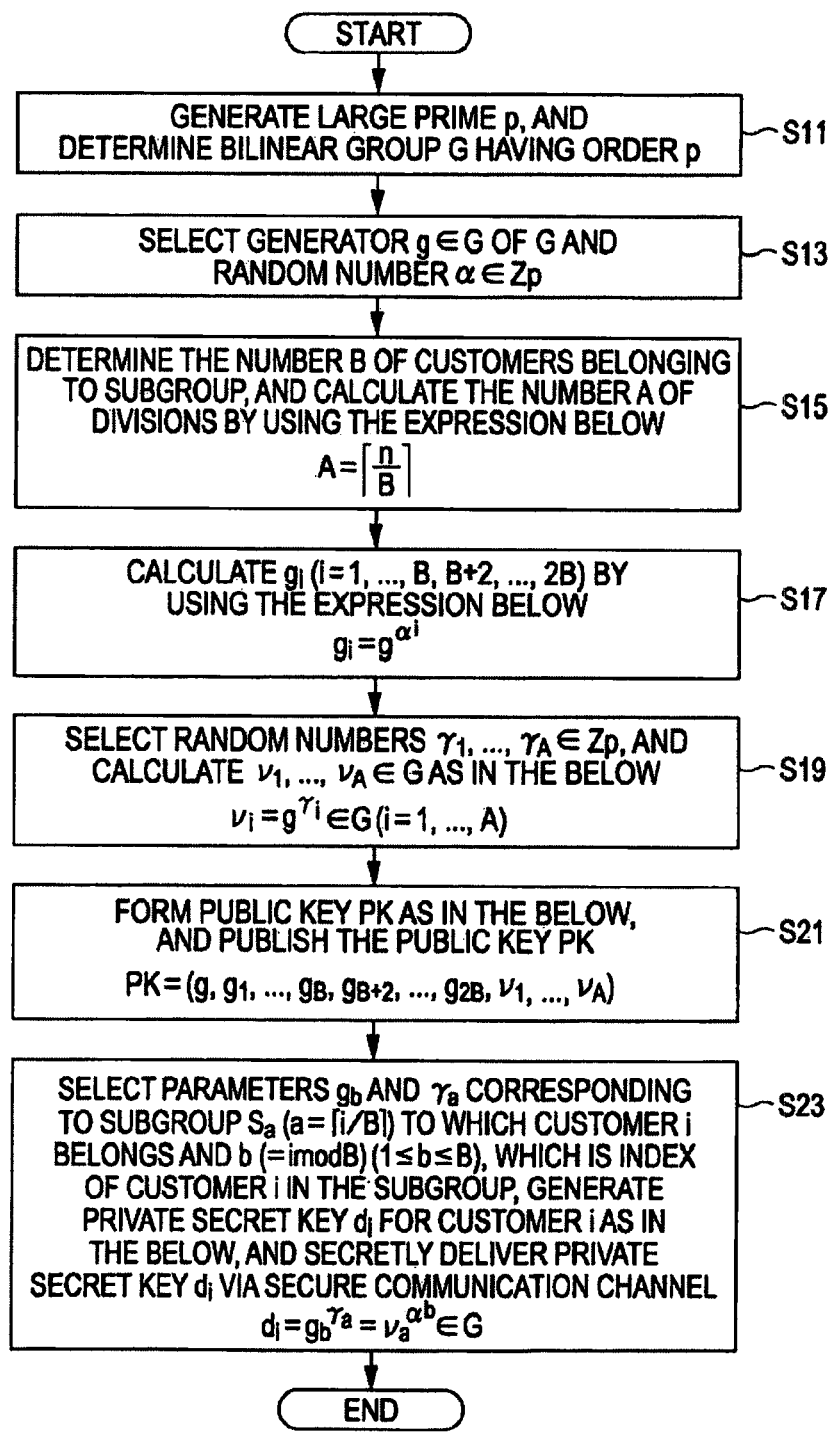
FIG. 5 is a flowchart for explaining a key generation phase according to the generalization method of the fundamental technology of the present invention.

Hereinafter, the key generation phase will be described with reference to FIGS. 4 and 5. FIG. 4 is an explanatory diagram for explaining the key generation phase in the generalization method of non-patent document 1. FIG. 5 is a flowchart of the key generation phase in the generalization method of non-patent document 1.

The center 51 generates private secret keys of the individual customers 55 and a public key in accordance with the procedure described below. First, the center 51 selects a large prime p at random, and determines a bilinear group G having the selected p as the order thereof (step S11).

Then, the center 51 individually selects, at random, g, which is a generator of the bilinear group G determined in step S11, and a center-secret random number α (α is an integer) (step S13).

Next, the center 51 determines the number B of customers belonging to a divided subgroup, and determines the number A of divisions in accordance with calculation using the expression below. Then, the center 51 divides customers into A subgroups (step S15).

[Math. 9]

$$A = \lceil \frac{n}{B} \rceil \quad \text{(Expression 1)}$$

Here, a sign indicated on the right side of the above expression is a sign representing "the minimum integer equal to or greater than (n/B)".

Then, the center 51 calculates, as in the below, a leaf key $g_i$ for i (i=1, . . . , B, B+2, 2B) (step S17).

[Math. 10]

$$g_i = g^{(\alpha)^i} \quad \text{(Expression 2)}$$

Next, the center 51 selects, at random, A random numbers γ ($γ_1$, . . . $γ_A$, γ is an integer) corresponding to the number A of subgroups. Then, $v_1$, . . . $v_A$ belonging to the bilinear group G are calculated as in the below (step S19).

[Math. 11]

$$v_i = g^{γ_i} \in G (i=1, \ldots, A) \quad \text{(Expression 3)}$$

Then, the center 51 determines the public key PK expressed below, on the basis of g selected in step S13 described above, $g_i$ calculated in step S17, and $v_i$ calculated in step S19, and publishes the public key PK (step S21).

$$PK = (g, g_1, \ldots g_B, g_{B+2}, \ldots, g_{2B}, v_1, \ldots, v_A) \quad \text{(Expression 4)}$$

Then, the center 51 selects parameters $g_b$ and $γ_a$ corresponding to a subgroup $S_a$ (a is the minimum integer of i/B or more) to which a customer i belongs and b=imodB (here, i is an integer of 1 or more and B or less), which is an index of the customer i in the subgroup, and generates a private secret key $d_i$ for the customer i calculated in the expression below (step S23).

[Math. 12]

$$d_i = g_b^{γ_a} = v_+^{α^b} \in G \quad \text{(Expression 5)}$$

Then, the center 51 secretly delivers private secret keys $d_i$ generated as described above to individual customers i via the secure one-to-one communication channels 53 (step S23).

As described above, in the key generation phase in non-patent document 1, in step S15, the center 51 divides a set of customers constituted by n customers into A subgroups each including B customers. Then, in step S11, step S13, step S17, and step S19, the center 51 sets various parameters necessary for the management of the content delivery system.

In addition, in step S21, the center 51 generates the public key PK by using the generated parameters. In the subsequent step S23, the center 51 generates private secret keys for individual customers on the basis of A, which represents the number of divisions of subgroups determined in step S15, and B, which represents the number of customers belonging to one subgroup.

On this occasion, for each customer, a subgroup to which the customer belongs and an index in the subgroup are determined on the basis of a customer's unique number assigned to the customer. As described above, since a kth-order polynomial is not used in generation of a private secret key, even if any number of customers collude with each other, fabrication of a private secret key for another customer and forming of an unauthorized key that allows an excluded customer to acquire a session key from a header cannot be performed.

<Encryption Phase>

Figure 6:
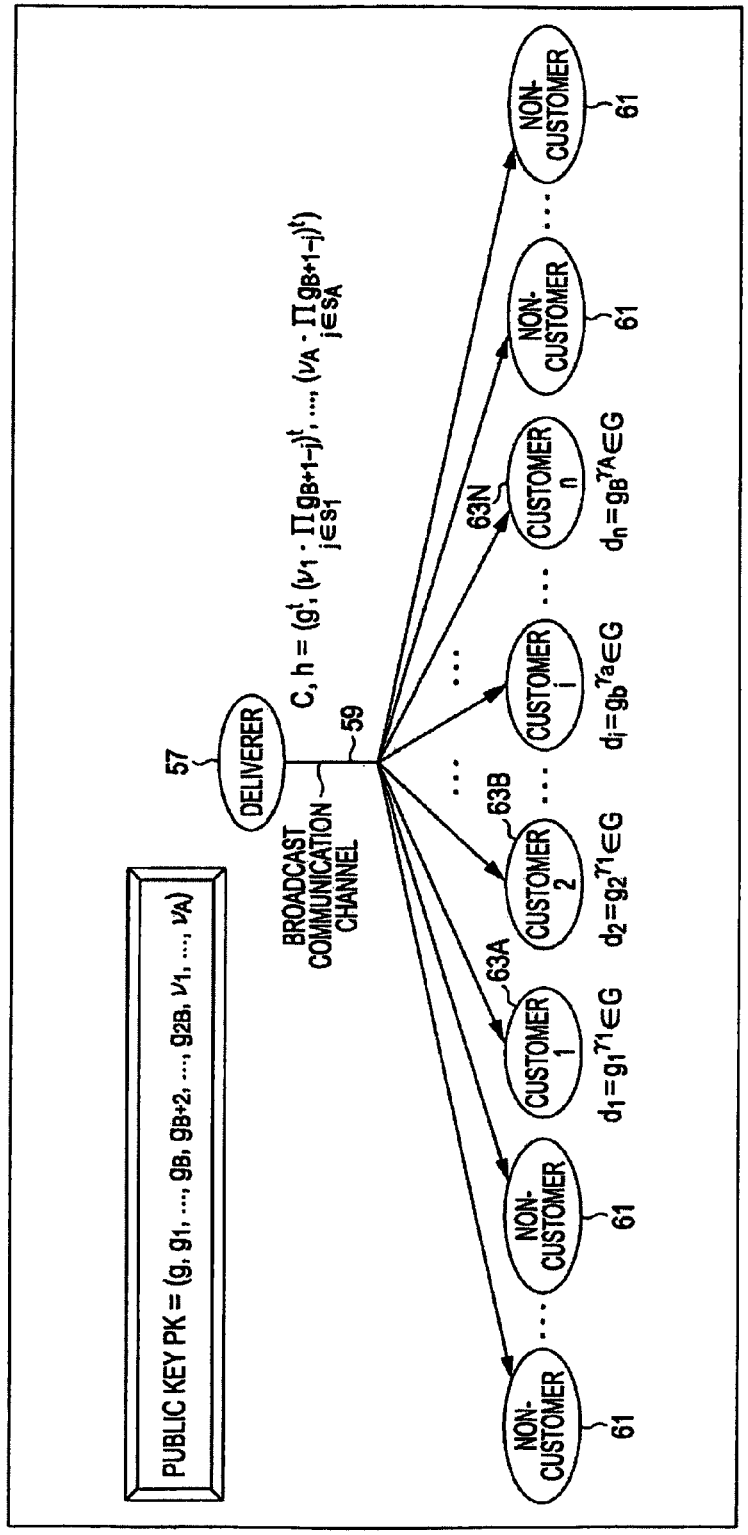
FIG. 6 is an explanatory diagram for explaining the overview of encryption according to the generalization method of the fundamental technology of the present invention.
Figure 7:
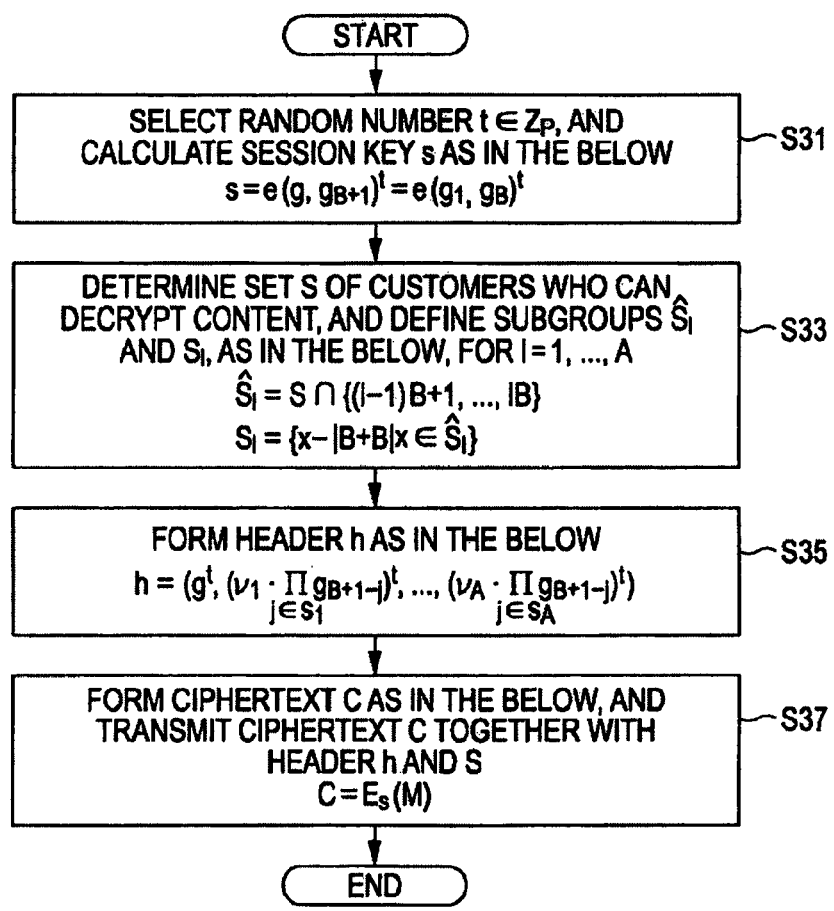
FIG. 7 is a flowchart for explaining an encryption phase according to the generalization method of the fundamental technology of the present invention.

Hereinafter, the encryption phase will be described with reference to FIGS. 6 and 7. FIG. 6 is an explanatory diagram for explaining the encryption phase in the generalization method of non-patent document 1. FIG. 7 is a flowchart of the encryption phase in the generalization method of non-patent document 1.

A deliverer 57 encrypts, in accordance with the procedure described below, content to be delivered, and delivers the encrypted content to non-customers 61 and customers 63 together via a broadcast communication channel 59.

First, the deliverer 57 selects an integer t at random, and calculates a session key s as in the below (step S31).

$$s = e(g_{B+1}, g)^t = e(g_B, g_1)^t \quad \text{(Expression 6)}$$

Then, the deliverer 57 determines a set S of customers who can decrypt content, and determines individual subgroups as in the below, for $l = 1, \ldots, A$ (step S33).

[Math. 13]

$$\hat{S}_l \cap \{(l-1)B+1, \ldots, lB\} \quad \text{(Expression 7)}$$

$$S_l = \{x - lB + B \mid x \in \hat{S}_l\} \subseteq \{1, \ldots, B\} \quad \text{(Expression 8)}$$

Here, the subscript l is a parameter representing a subgroup. A set represented by expression 7 above is a set of customers and non-customers included in the subgroup represented by the parameter l. The set represented by expression 8 above is a set representing the place of a customer in the subgroup represented by the parameter l.

Then, the deliverer 57 forms a header h necessary for a customer 63 to calculate a session key s, as in the below (step S35).

[Math. 14]

$$h = \left(g^t, \left(v_1 \cdot \prod_{j \in S_1} g_{B+1-j}\right)^t, \ldots, \left(v_A \cdot \prod_{j \in S_A} g_{B+1-j}\right)^t\right) \in G^{A+1} \quad \text{(Expression 9)}$$

Next, the deliverer 57 encrypts content to be transmitted, on the basis of the session key s calculated in step S31, as shown by expression 10. After that, the deliverer 57 transmits the encrypted content C, together with information on the set S determined in step S33 and the header h calculated in step S35, irrespective of whether the non-customers 61 or the customers 63, via the broadcast communication channel 59 (step S37).

$$C = E_s(M) \quad \text{(Expression 10)}$$

As described above, at the time of delivery, after generating a session key in step S31 in the encryption phase, the deliverer 57 determines a set of customers that can decrypt content belonging to each subgroup in step S33. After that, in step S35, the deliverer 57 creates a header h including elements corresponding to individual subgroups. Here, each element of the header h is formed only by a parameter $g_b$ corresponding to a customer who can perform decryption in each of the subgroups and does not include $g_b$ corresponding to an excluded customer. Thus, at the time of decryption described later, exclusion of non-customers can be realized.

<Decryption Phase>

Figure 8:
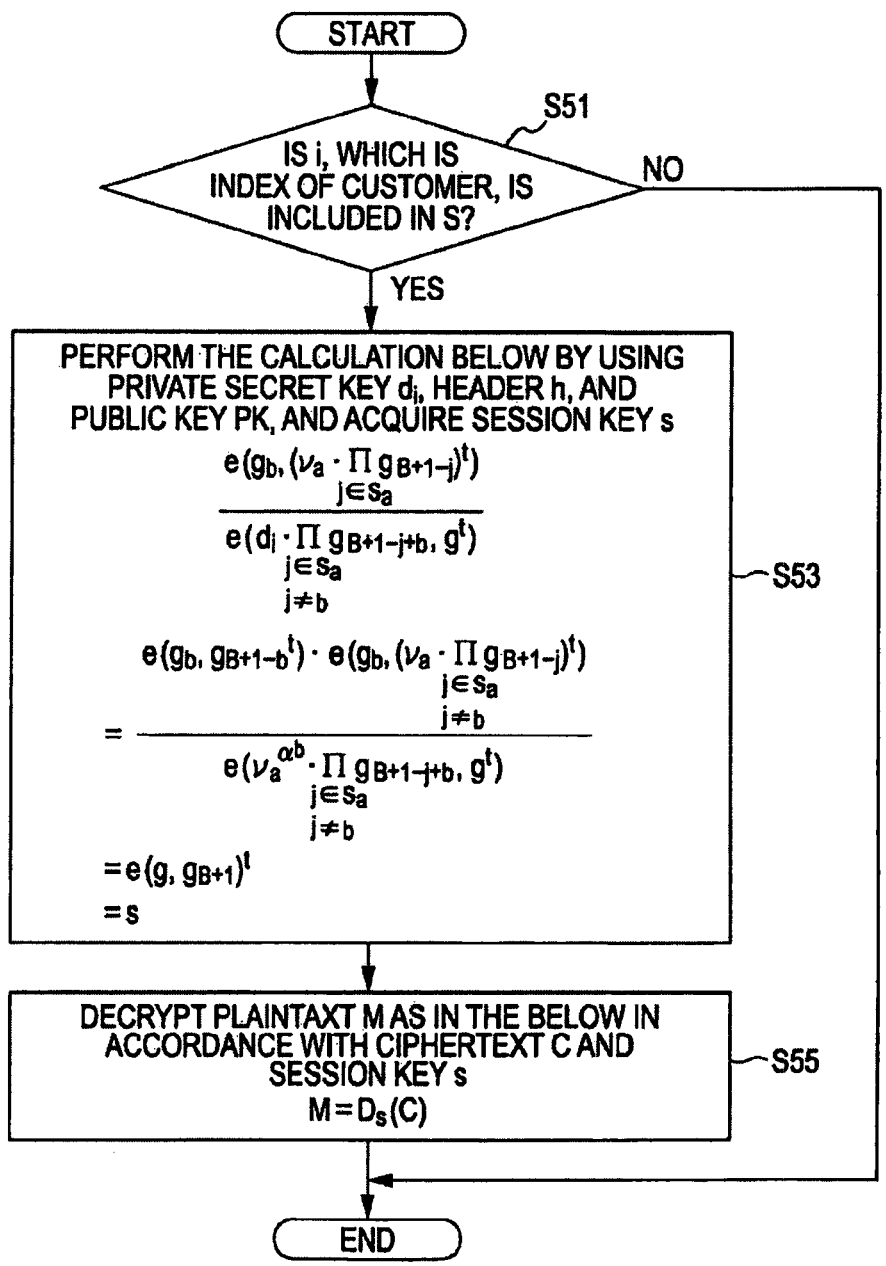
FIG. 8 is a flowchart for explaining a decryption phase according to the generalization method of the fundamental technology of the present invention.

Hereinafter, the decryption phase will be described with reference to FIG. 8. FIG. 8 is a flowchart of the decryption phase in the generalization method of non-patent document 1.

A customer i who received the delivery of encrypted content or the like performs decryption processing for the encrypted content in accordance with the procedure described below.

First, a customer 63 checks whether or not i, which is their own index, is included in a set S delivered from the deliverer 57 (step S51). In a case where their own index i is not included in the set S, the customer 63 determines that the customer 63 is excluded, and terminates the decryption process. In a case where their own index i is included in the set S, the customer 63 continues to perform the processing described below.

Next, the customer 63 selects, from a header h transmitted, a header element corresponding to a subgroup $S_a$ to which the customer 63 belongs, and calculates a session key s (step S53). That is, the header h is constituted by header elements corresponding to individual subgroups, as represented by $h = (C_0, C_1, \ldots, C_A)$. The customer 63 selects elements $C_0$ and $C_a$ corresponding to the subgroup $S_a$ to which the customer 63 belongs, and acquires a session key s, as in the calculation below, on the basis of the header elements.

[Math. 15]

$$s = \frac{e(g_b, C_a)}{e\left(d_i \cdot \prod_{\substack{j \in S_a \\ j \neq b}} g_{B+1-j-b}, C_0\right)} \quad \text{(Expression 11-1)}$$

$$= \frac{e\left(g_b, \left(v_a \cdot \prod_{j \in S_a} g_{B+1-j}\right)^t\right)}{e\left(v_a^{(ab)} \cdot \prod_{\substack{j \in S_a \\ j \neq b}} g_{B+1-j+b}, g^t\right)} \quad \text{(Expression 11-2)}$$

$$= \frac{e(g_b, g_{B+1-b}^t) \cdot e\left(g_b, \left(v_a \cdot \prod_{j \in S_a} g_{B+1-j}\right)^t\right)}{e\left(v_a^{(ab)} \cdot \prod_{\substack{j \in S_a \\ j \neq b}} g_{B+1-j+b}, g^t\right)} \quad \text{(Expression 11-3)}$$

-continued $$e(g, g_{B-1})^t \cdot$$ (Expression 11-4)

$$= \frac{e\left(g^t, \left(v_a^{(a^b)} \cdot \prod_{\substack{j \in S_a \\ j \neq b}} g_{B+1-j+b}\right)^t\right)}{e\left(v_a^{(a^b)} \cdot \prod_{\substack{j \in S_a \\ j \neq b}} g_{B+1-j+b}, g^t\right)}$$

$$= e(g, g_{B+1})^t$$ (Expression 11-5)

As is clear from expression 11-5 and expression 6 above, by using the header h transmitted from the deliverer 57, the public key PK, and the private secret key $d_i$ kept by the customer 63 themselves, the customer 63 is able to calculate the same one as the content key s used by the deliverer 57 for encryption.

Then, the customer 63 decrypts the delivered encrypted content C into plaintext M by using the session key s calculated in step S53 above (step S55).

$$M = D_s(C)$$ (Expression 12)

As described above, at the time of decryption, first in step S51, the customer 63 checks whether or not the customer 63 is excluded. In a case where the customer 63 is excluded, since the customer 63 cannot acquire a session key s because of the reason described later, the customer 63 terminates the decryption process. A customer who understands, from the determination of step S51, that the customer is not excluded extracts, from the transmitted header, a header element corresponding to a subgroup to which the customer belongs, and performs a decryption operation by using a bilinear map represented by expressions 11-1 to 11-5 on the basis of the header element, the private secret key for the customer, and the public key, so that a session key s can be acquired, in step S53. Then, by using the calculated session key s, the customer performs decryption of ciphertext.

Here, even if an excluded customer performs a decryption operation by using the bilinear map represented by expressions 11-1 to 11-5, since a value $g_{B+1-b}$ corresponding to their own $g_b$ is not included in the following part:

[Math. 16]

$$\left(v_a \cdot \prod_{j \in S_a} g_{B+1-j}\right)^t$$ (Expression 13)

of expression 11-2 in step S53, transformation into expression 11-3 cannot be achieved, due to the difficulty of BDHEP (Bilinear Diffie-Hellman Exponential Problem), which is the basis for security in non-patent document 1. Thus, a correct session key s cannot be calculated.

As described above, the method of non-patent document 1 solves the collusion problem, which has been problematic in a conventional public key content delivery method using a kth-order polynomial. In addition, since the center divides a set of customers into A subgroups in advance in step S15 of the key encryption phase, a header that a deliverer needs to generate can be configured to always have A+1 elements. Thus, irrespective of the number of excluded customers, the header size can be maintained constant.

As described above, in the method of non-patent document 1, a header having a constant size always must be transmitted. Thus, a problem exists in that efficient content delivery cannot be achieved in a case where no excluded customer exists or a small number of excluded customers exists. In the actual content delivery system, the number of customers is often a very large value. Thus, the number of excluded customers is often a small value relative to the total number of customers. In addition, if the number of excluded customers is large, the content delivery system itself may be collapsed. Thus, as a content delivery system, in a case where no excluded customer exists or the number of excluded customers relative to the total number of customers remains small, delivering content efficiently is required.

However, as described above, in non-patent document 1, it is difficult to meet such a condition. Furthermore, in non-patent document 1, in order to perform an operation using a bilinear map in expression 11-1 in step S53 of the decryption phase, the product of parameters assigned to non-excluded customers existing within a subgroup to which a customer belongs and a private secret key kept by the customer needs to be calculated in advance, as represented in expression 14 below.

[Math. 17]

$$d_i \cdot \prod_{\substack{j \in S_a \\ j \neq b}} g_{B+1-j+b}$$ (Expression 14)

Here, in a case where an operation using a bilinear map is represented by PAIR, an inverse operation on a bilinear group $G_1$ is represented by INV, multiplication on a bilinear group G is represented by MUL, and the number of excluded customers in a subgroup $S_a$ to which a customer i belongs is represented by $r_a$, the calculation amount of an operation that a customer needs to perform in the decryption phase can be expressed as "2PAIR+INV+(B−1−$r_a$)MUL".

As is clear from this, a problem exists in that in a case where the number B of customers who belong to a divided subgroup is large or a case where the number $r_a$ of excluded customers in a subgroup to which a customer belongs is small, the amount of calculation that each customer needs to perform at the time of decryption increases.

As described above, even in a case where the generalization method of non-patent document 1 is used, when the number of divisions of a set of customers is increased, the amount of calculation performed by each customer at the time of decryption of content can be reduced. However, the header size is increased. In addition, on the contrary, when the number of divisions of a set of customers is decreased, the header size can be reduced. However, a problem exists in that the amount of calculation increases. In addition, even in a case where the number of excluded customers is small, a header h having a constant size always needs to be delivered. Thus, a problem exists in that under a situation that is realistically most likely to occur, such as a case where no excluded customer exists or the percentage of the number of excluded customers relative to the total number of customers is small, the header size cannot be reduced and the redundancy of data at the time of delivery of content increases.

Thus, after having been committed to intense study in order to solve the above-described problems, the inventors of this application have developed an encryption key delivery system according to an embodiment of the present invention, as described below. In a key generation device according to this embodiment, by configuring a logical tree where some parameters are added to the method of non-patent document 1, even in a case where the number of excluded customers is small, the header size can be reduced compared with the method described in non-patent document 1. In addition, by providing such a configuration, the calculation amount of an operation that a customer needs to perform at the time of decryption can be reduced to an equivalent amount or less. Thus, efficient content delivery can be realized.

Description of This Embodiment

Hereinafter, in the light of the fundamental technology described above, a key generation device, an encryption device, and a reception device according to this embodiment will be described in detail. The key generation device 20 according to this embodiment constructs a logical tree employing the method of non-patent document 1. With the use of the logical tree, the key generation device 20 according to this embodiment realizes efficient content delivery compared with the method of non-patent document 1 in a case where no excluded customer exists or the number of excluded customers is small.

Figure 9:
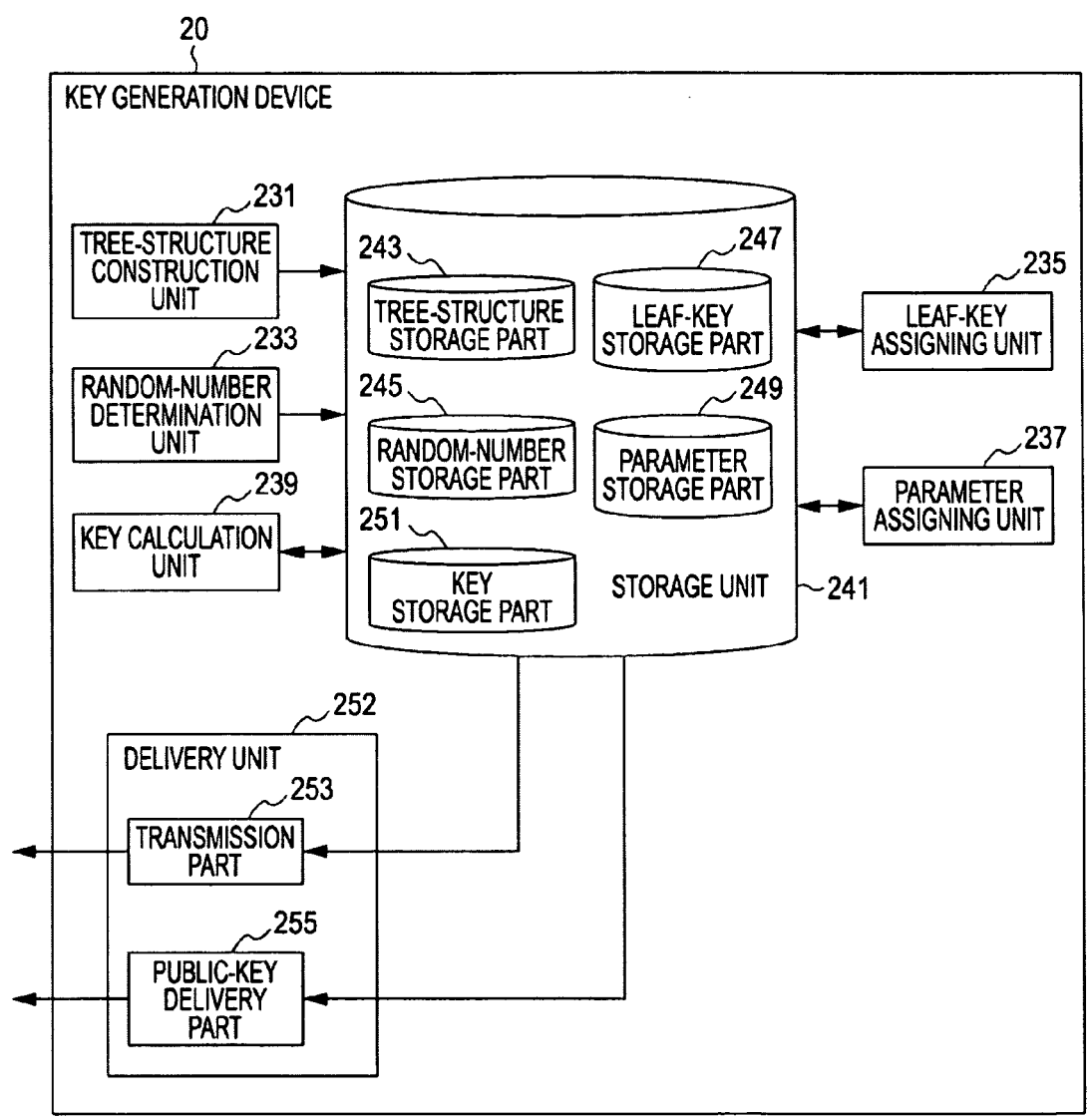
FIG. 9 is a block diagram for explaining the configuration of a key generation device according to a preferred embodiment of the present invention.

First, the configuration of the key generation device 20 according to this embodiment will be described with reference to FIG. 9. FIG. 9 is a block diagram showing the configuration of the key generation device 20 according to this embodiment.

The key generation device 20 includes, for example, a tree-structure construction unit 231, a random-number determination unit 233, a leaf-key assigning unit 235, a parameter assigning unit 237, a key calculation unit 239, a storage unit 241, and a delivery unit 252.

The tree-structure construction unit 231 constructs a logical tree, which is an important element of the key generation device according to this embodiment. That is, the tree-structure construction unit 231 hierarchically constructs a Y-ary tree structure where n target reception devices are assigned to leaves and the height is represented by $(\log_Y n)$. Furthermore, subgroups each having a Y-ary tree where each of intermediate nodes existing between leaves and a root are defined as a parent node are formed. That is, with the tree-structure construction unit 231, Y-ary tree structures where Y branches always grow downward from one node are hierarchically stacked. When the whole hierarchized Y-ary tree structure constructed is viewed, only one root exists in the uppermost layer (hereinafter, referred to as a 0th layer), and Y child nodes having this root as a parent node are constructed, as a first layer, below the root. In addition, in a second layer, further $Y^2$ child nodes having the Y child nodes existing in the first layer as parent nodes exist. By repetition of such structures, n leaves in total exist in the lowermost layer, that is, a $(\log_Y n)$th layer.

Here, in a case where one branch grows downward from one node and one node exists at the end of the branch, the upper node is relatively called a parent node and the lower node is relatively called a child node. Such a concept regarding the parent node and the child node is based on a relative idea. For example, in a case where three nodes are linked above and below through a branch, if the uppermost node is referred to as a parent node, the node located in an intermediate position is referred to as a child node. In addition, when attention is paid to the lowermost node, the lowermost node serves as a child node for the node located in the intermediate position serving as a parent node.

In addition, in the hierarchized tree structure, each of nodes existing between a root existing in the uppermost layer and n leaves existing in the lowermost layer is called an intermediate node.

The random-number determination unit 233 determines various random numbers used by the key generation device according to this embodiment and bilinear groups. That is, the random-number determination unit 233 selects, at random, a prime p and determines a bilinear group G having the prime p as the order thereof. In addition, the random-number determination unit 233 selects, at random, g, which represents a generator of G, and selects, at random, an integer α, which represents a secret random number.

The leaf-key assigning unit 235 assigns leaf keys $g_y$ to n terminal leaves and all the intermediate nodes, which are not the leaves and the root, in the hierarchized Y-ary tree structure constructed by the tree-structure construction unit 231.

The parameter assigning unit 237 assigns arbitrary parameters $v_{x,y}$ to all the nodes other than the n terminal leaves, that is, to the root in the uppermost layer and all the intermediate nodes existing between the root and the leaves in the hierarchized Y-ary tree structure constructed by the tree-structure construction unit 231. Here, each of x and y is a subscript representing the position of a node, x represents a layer, and y represents the place of the node in the layer x.

The key calculation unit 239 calculates a public key and private secret keys on the basis of the bilinear group G and the random numbers determined by the random-number determination unit 233, the leaf keys assigned by the leaf-key assigning unit 235, the parameters assigned by the parameter assigning unit 237, and the like.

The storage unit 241 includes, for example, a tree-structure storage part 243, a random-number storage part 245, a leaf-key storage part 247, a parameter storage part 249, a key storage part 251, and the like. Variables and calculation results that become necessary in the middle of processing performed by each processing unit or results obtained from the processing are stored in these storage parts. Individual processing units, such as the tree-structure construction unit 231, the random-number determination unit 233, the leaf-key assigning unit 235, the parameter assigning unit 237, and the key calculation unit 239, are capable of freely writing and reading data to and from the storage unit 241.

In addition, in the storage unit 241 various data can be stored in a part different from the above described storage parts 243, 245, 247, 249, and 251. Note that although a state where various storage parts exist independently within the storage unit 241 is shown in FIG. 9, various storage parts do not necessarily exist individually, and various data may be stored in a storage part as a whole. In addition, a storage medium provided with a secure module may be used as the storage unit 241.

The delivery unit 252 in the key generation device according to this embodiment includes, for example, a transmission part 253 and a public-key publishing part 255. The transmission part 253 transmits, to each reception device, a private secret key calculated by the key calculation unit 239 and stored in the key storage part 251. In addition, the public-key publishing part 255 publishes to each reception device a public key calculated by the key calculation unit 239 and stored in the key storage part 251.

Figure 10:
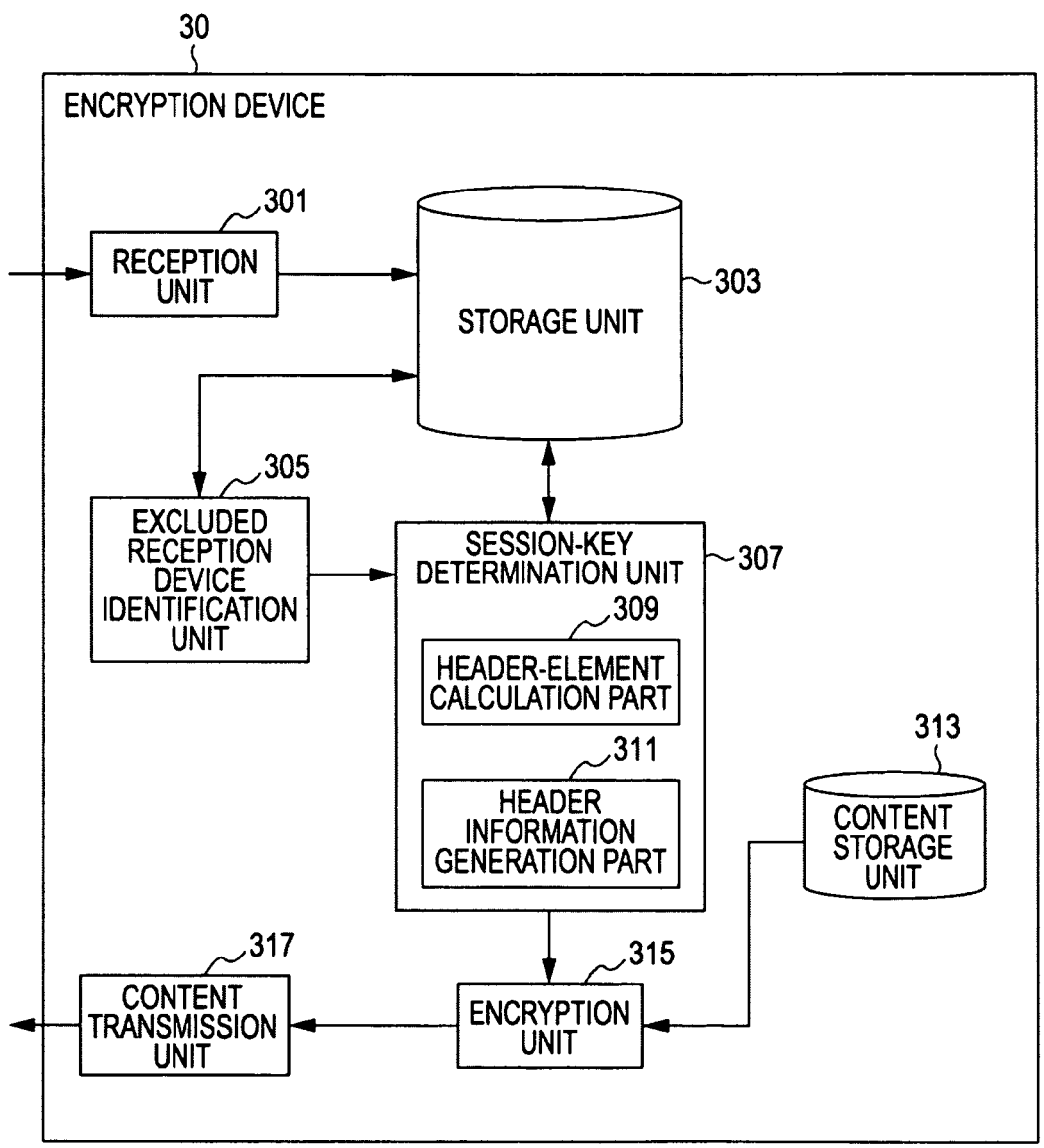
FIG. 10 is a block diagram for explaining the configuration of an encryption device according to the embodiment.

Now, the configuration of the encryption device 30 according to this embodiment will be described with reference to FIG. 10. FIG. 10 is a block diagram showing the configuration of the encryption device 30 according to this embodiment.

As shown in FIG. 10, the encryption device 30 includes, for example, a reception unit 301, a storage unit 303, an excluded reception device identification unit 305, a session-key determination unit 307, a content storage unit 313, an encryption unit 315, and a content transmission unit 317.

The reception unit 301 receives a public key generated and published by the key generation device 20. In addition, the reception unit 301 is capable of further receiving a prime p generated by the key generation device 20 and information on a set S of non-excluded reception devices, which is information identifying an excluded reception device, as well as the public key.

The storage unit 303 stores, for example, the public key generated by the key generation device 20. In addition, the storage unit 303 is capable of storing information on a prime p, information on a set S of non-excluded reception devices, and the like, as well as the public key.

The excluded reception device identification unit 305 identifies, among a plurality of reception devices 40 connected to the encryption device 30 via the communication network 12, an excluded reception device for which delivery of content is eliminated, and determines a set S of non-excluded reception devices. On the occasion of determining the set S, the excluded reception device identification unit 305 is capable of referring to various data stored in the storage unit 303.

The session-key determination unit 307 determines a session key s for encryption of content to be delivered. The session-key determination unit 307 may further include, for example, a header-element calculation part 309 and a header information generation part 311.

On the occasion of determining a session key s, the session-key determination unit 307 selects, at random, an integer t, and performs an operation of a bilinear map by using a published public key.

The header-element calculation part 309 marks all the individual nodes existing in a path extending from a leaf to which an excluded reception device is assigned to the root in the hierarchized tree structure constructed by the key generation device 20, and calculates header elements on the basis of parameters assigned to the marked nodes and leaf keys assigned to intermediate nodes for which the marked nodes serve as parent nodes.

The header information generation part 311 generates header information on the basis of the header elements obtained by the header-element calculation part 309 and the public key.

The content storage unit 313 stores unencrypted content. In addition, the content storage unit 313 may store content acquired from a medium such as a CD (Compact Disk), a DVD (Digital Versatile Disk), or a memory card. Here, the above-mentioned content may be any content data, for example, video content constituted by moving images or still images such as movies, television programs, video programs, or diagrams, audio content such as music, lecture, or radio programs, game content, document content, or software. Video content may include audio data as well as video data.

The encryption unit 315 selects, from the content storage unit 313, content to be delivered, and encrypts the content by using a session key s calculated by the session-key determination unit 307.

The content transmission unit 317 transmits, to each reception device via the communication network 12, the encrypted content encrypted by the encryption unit 315, the header determined by the header information generation part 311, and the set S identified by the excluded reception device identification unit 305.

Figure 11:
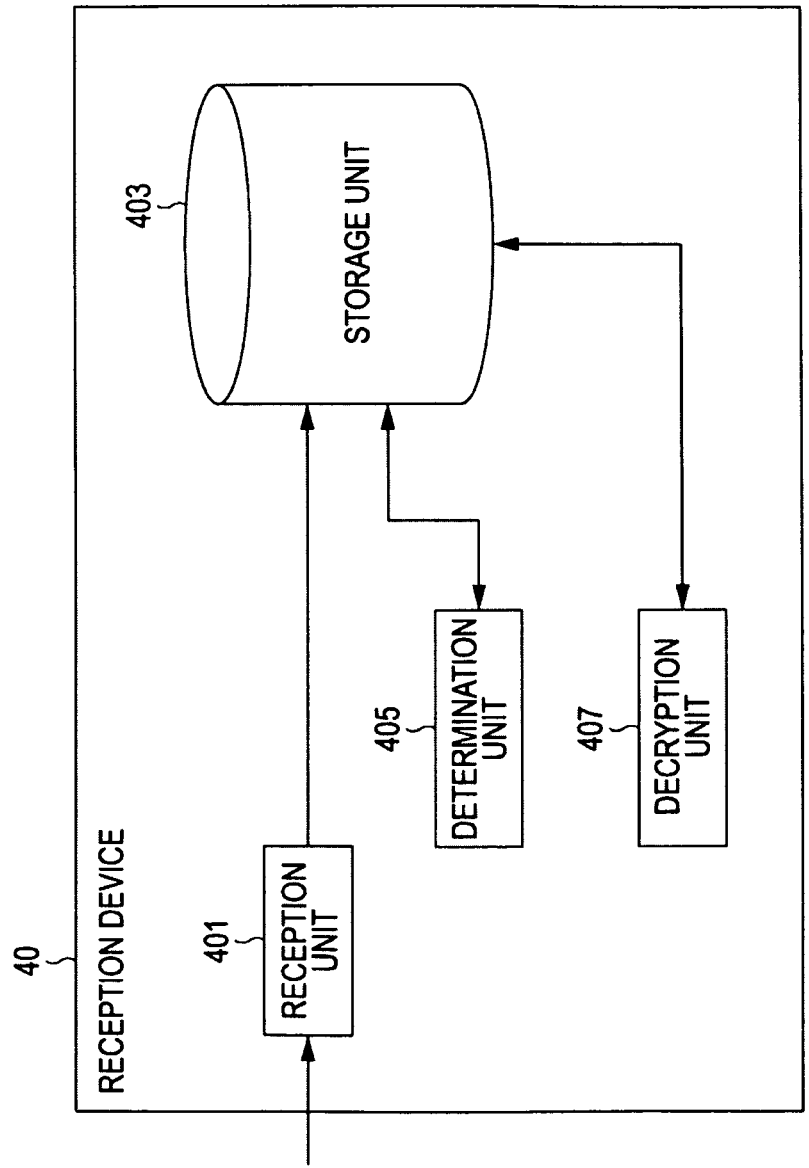
FIG. 11 is a block diagram for explaining the configuration of a reception device according to the embodiment.

Now, the configuration of the reception device 40 according to this embodiment will be described with reference to FIG. 11. FIG. 11 is a block diagram showing the configuration of the reception device 40.

As shown in FIG. 11, the reception device 40 includes, for example, a reception unit 401, a storage unit 403, a determination unit 405, and a decryption unit 407.

The reception unit 401 receives a private secret key generated by the key generation device 20. In addition, the reception unit 401 is capable of further receiving a public key generated by the key generation device 20 and information on a set S of non-excluded reception devices, which is information identifying an excluded reception device, as well as the private secret key. In addition, the reception unit 401 is also capable of receiving content encrypted by the encryption device 30.

The storage unit 403 stores, for example, the public key and the private secret key generated by the key generation device 20. In addition, the storage unit 403 is capable of storing information on a set S of non-excluded reception devices and content information on delivered encrypted content, decrypted content, and the like, as well as the encryption keys.

The determination unit 405 determines whether or not the reception device itself is included in the received set S. In accordance with a result of the determination by the determination unit 405, the decryption unit 407 performs decryption processing for encrypted content.

The decryption unit 407 calculates a session key s, which is necessary for decryption of encrypted content, by using the header h received by the reception unit 401 and the public key and the private secret key stored in the storage unit 403. After calculating the session key s, the decryption unit 407 continues to perform decryption of encrypted content.

In the above, an example of the functions of the key generation device 20, the encryption device 30, and the reception device 40 according to this embodiment has been described. Each of the components described above may be constituted by using a general-purpose member or circuit or may be constituted by hardware specialized for a function of the component. In addition, all the functions of the individual components may be performed by the CPU or the like. Thus, in accordance with the technical level on each occasion of implementation of this embodiment, the configuration to be used can be changed in an appropriate manner.

The encryption key delivery system 10 according to this embodiment is constituted by three phases, key generation, encryption, and decryption, as in non-patent document. The key generation phase is performed only once by the center at the time of configuration of the system. In addition, the encryption phase and the decryption phase are performed by a deliverer and a customer, respectively, every time delivery is carried out. Note that individual signs and operations used for explanation of the encryption key delivery system 10 according to this embodiment are defined as in the description of the fundamental technology. Hereinafter, first, definition and description of a logical tree configured in this embodiment will be provided. After that, each phase will be described in detail.

<Structure and Definition of Logical Tree>

First, description and definition of a logical tree necessary for explanation of the key generation device 20 according to this embodiment will be provided. In the key generation device 20 according to this embodiment, by assigning each customer to a leaf and assigning the division of customers in non-patent document 1 to the logical tree, efficient content delivery is realized. This logical tree is constructed by the tree-structure construction unit 231 in the key generation device 20 according to this embodiment.

Note that, for simplification, a Y-ary tree is used in this embodiment. In addition, because all the customers need to be assigned to leaves, it is assumed that the total number n of customers is a value that can be expressed as a power of Y. However, a case where n cannot be expressed as a power of Y often occurs in the actual content delivery. Nevertheless, this case can be easily handled by preparing leaves in advance, the number of which can be expressed as a power of Y, which is sufficiently larger than n. Hereinafter, regarding the structure of a logical tree, each definition will be provided.

For a Y-ary tree used in this embodiment, the number of leaves is denoted by n. Thus, let the height of the Y-ary tree except for the root be denoted by H, H=log$_Y$n is yielded. In addition, let the total number of nodes except for leaves be denoted by N, N=(n−1)/(Y−1) is yielded. Thus, apart from the root, H layers exist in the Y-ary tree. Here, these layers are defined as Layers. That is, in the form of a set of child nodes of the root being defined as Layer1 and a set of child nodes of all the nodes in the Layer1 (that is, grandchild nodes of the root) being defined as Layer2, each layer of the Y-ary tree is defined as Layer x (x=0, . . . , H). Here, x is a subscript representing a layer. In addition, by letting the index of each node included in the Layer x be denoted as a node index, the definition (x,y) (y=1, . . . , Y$^x$) is provided. Here, the root is a node in the Layer0 and the index of the root is (0,1).

Figure 12:
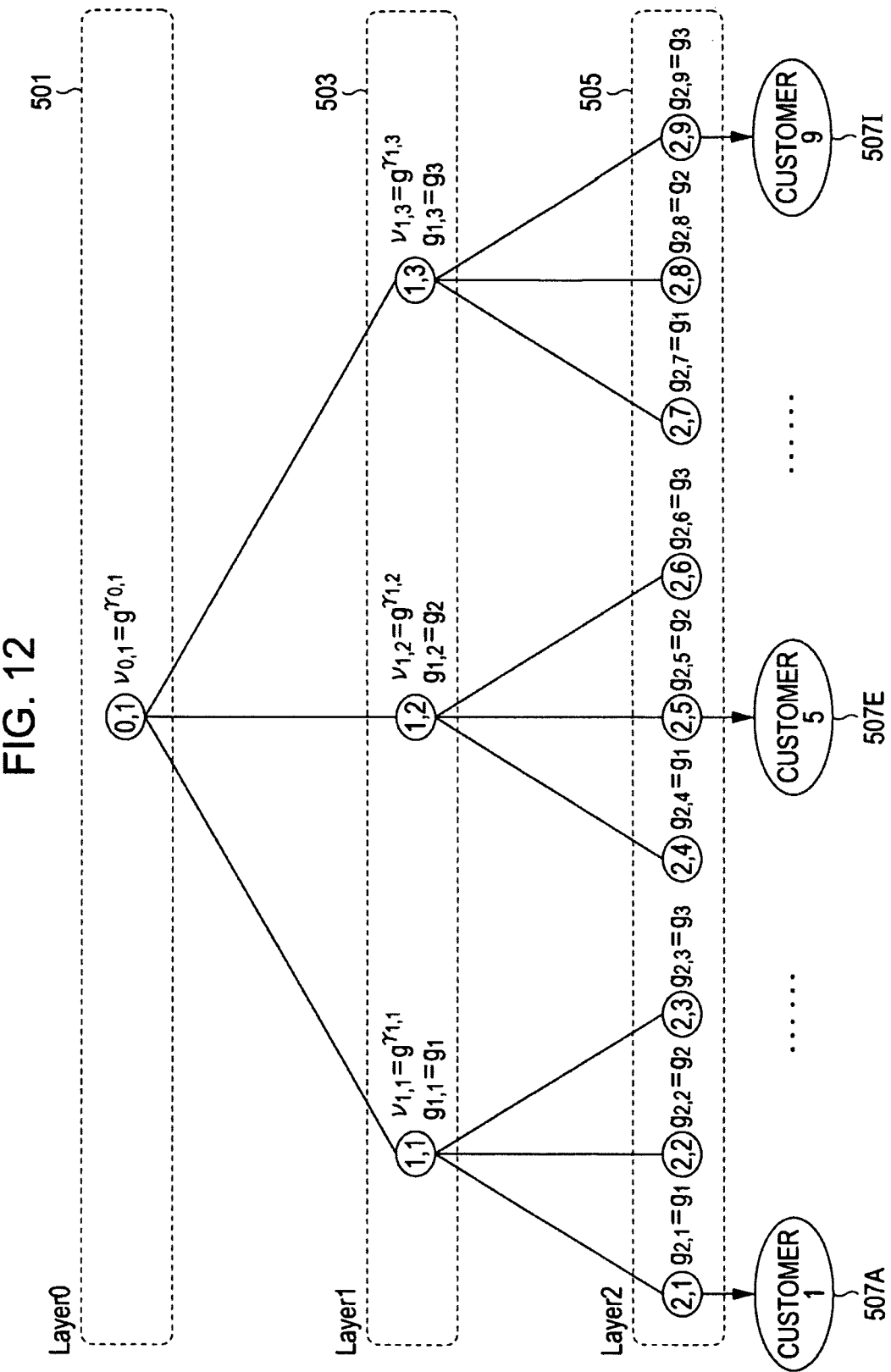
FIG. 12 is an explanatory diagram for explaining a specific example of a logical tree according to the embodiment.

As an example of the Y-ary tree defined as described above, a case where the number n of customers is 9 and the number Y of branches is 3 is shown in FIG. 12.

Since the number n of customers is 9, the height of a ternary tree except for the root is expressed as log$_3$9=2. Thus, in the ternary tree, three layers including the root exist. That is, a layer 501 including the root is defined as a Layer0, and a layer 503 including three nodes, which are child nodes of the root, is defined as a Layer1. A layer 505 for child nodes in a case where the three nodes existing in the Layer1 individually serve as parent nodes is defined as a Layer2. Since three child nodes are formed from each of the three nodes existing in the Layer1, nine leaves in total exist in the Layer2.

In addition, the number N of nodes except for leaves, that is, the sum of the number of roots and the number of intermediate nodes is expressed as (9−1)/(3−1)=4.

Node indices assigned to individual nodes including leaves are, for example, (0,1) for the root and (1,1), (1,2), and (1,3) for the three nodes in the Layer1 from the left end. In addition, node indices (2,1), (2,2), . . . , (2,9) are provided to the individual nine nodes in the Layer2, that is, the leaves, from the left end.

In addition, in the key generation device 20 according to this embodiment, the reception devices 40, that is, customers 507 for content delivery, are assigned to the leaves. That is, a customer 1 (507A), a customer 2 (507B), . . . , a customer 9 (S07I) are assigned to leaves (2,1), (2,2), . . . , (2,9) in the Layer2, respectively.

Now, hereinafter, a specific description of the encryption key delivery system according to this embodiment will be provided by using the above-described definition of the logical tree.

<Operation of Key Generation Device 20: Encryption Key Generation Phase>

Figure 13:
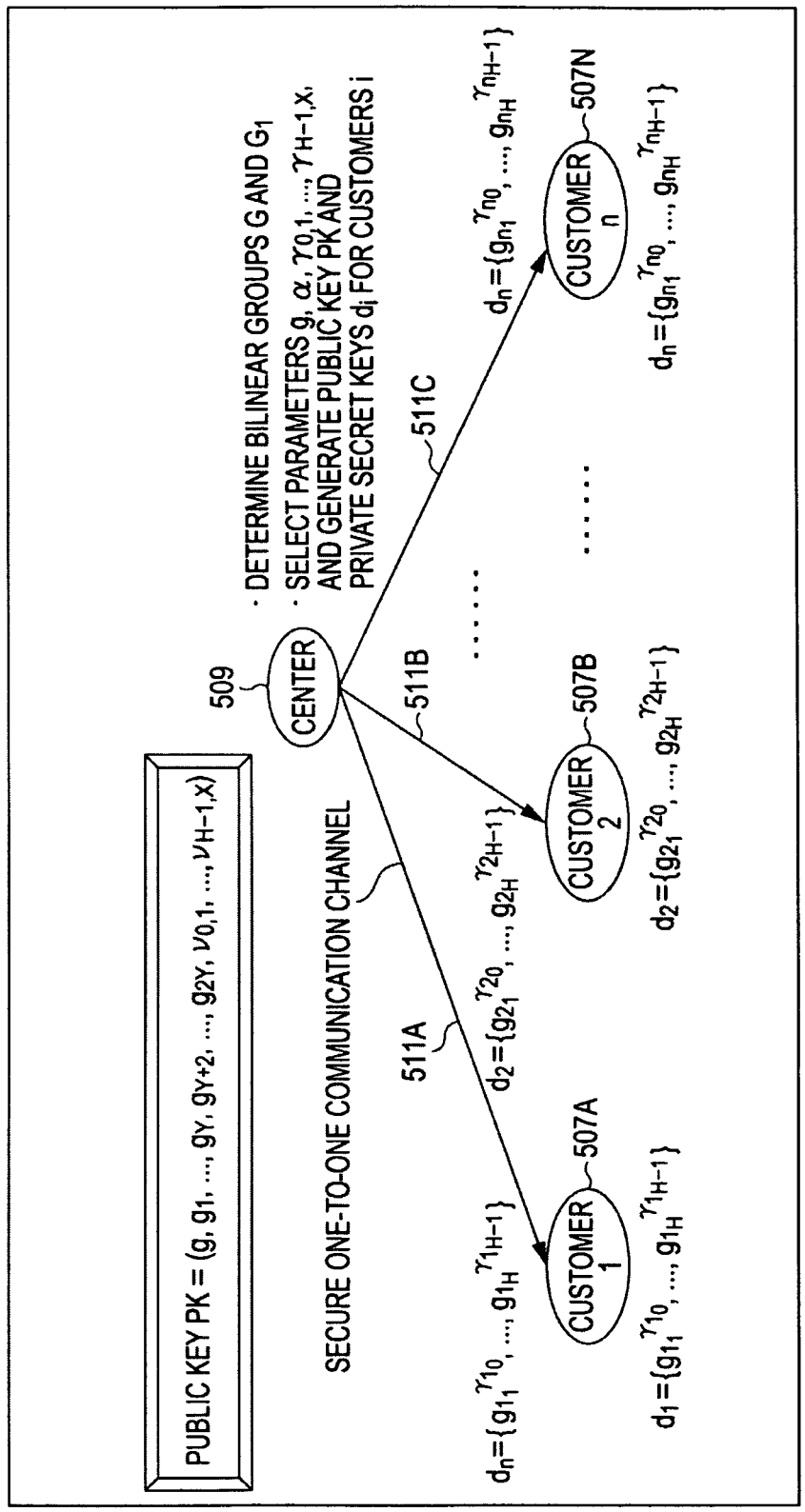
FIG. 13 is an explanatory diagram for explaining the overview of key generation according to the embodiment.
Figure 14:
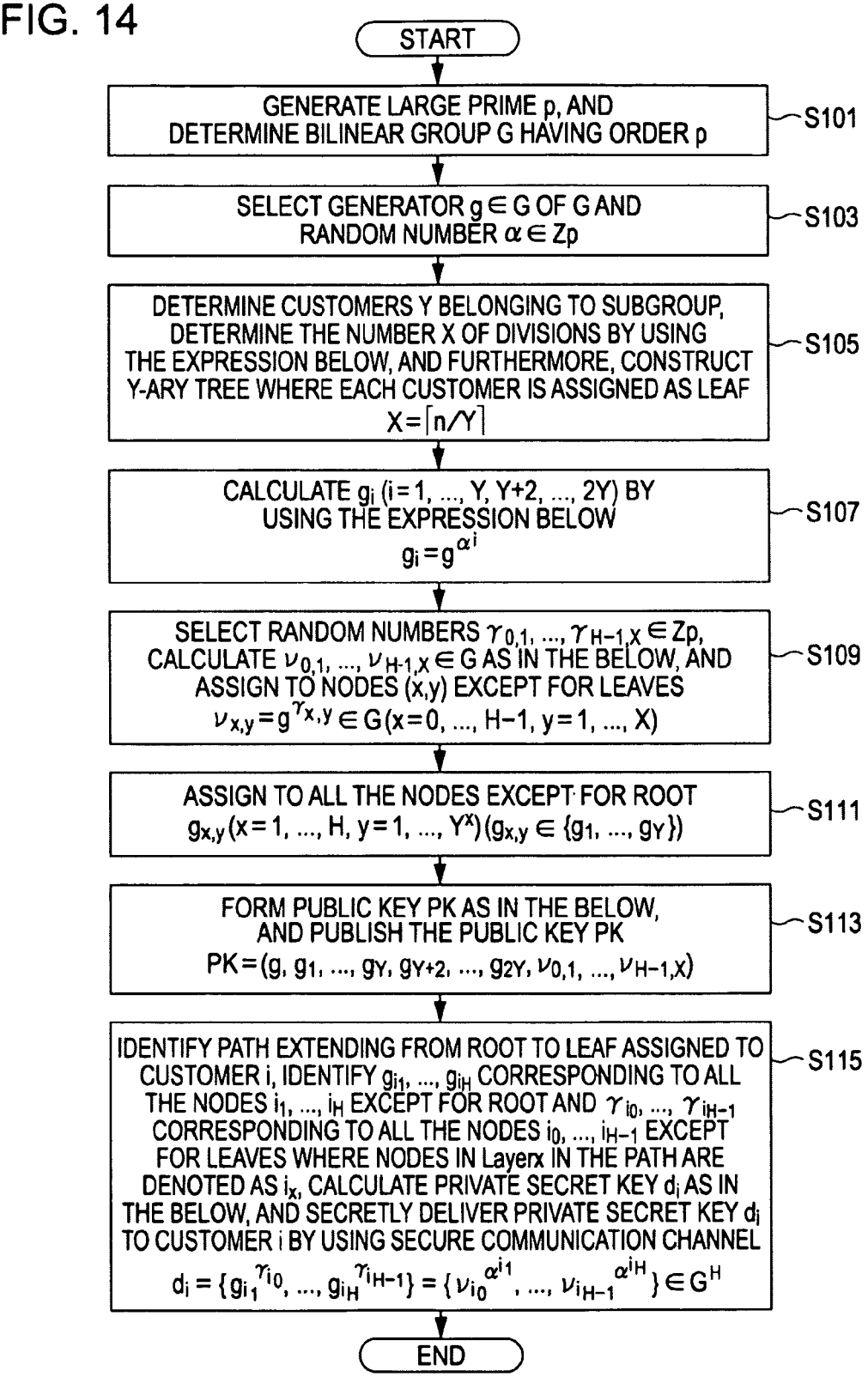
FIG. 14 is a flowchart for explaining a key generation phase according to the embodiment.

The center operates the key generation device 20 that the center owns, and generates a public key and private secret keys for individual customers in accordance with the procedure described below. Hereinafter, the operation of the key generation device 20 according to this embodiment will be described in detail with reference to FIGS. 12, 13, and 14. FIG. 13 is an explanatory diagram for explaining the overview of key generation by the key generation device 20. FIG. 14 is a flowchart of the encryption key generation phase by the key generation device 20.

First, the random-number determination unit 233 of the key generation device 20 selects, at random, a prime p, which is a large value, and determines a bilinear group G having the selected p as the order thereof (step S101). Here, the prime p of a large value means a prime having a large number of digits. By selecting a prime having a large number of digits for which a discrete algorithm problem cannot be easily solved, the random-number determination unit 233 ensures the security of encryption keys according to this embodiment.

Then, the random-number determination unit 233 selects, at random, g, which is a generator of the bilinear group G, and a center-secret random number α (α is an integer) (step S103).

Data on the prime p, the bilinear group G, the generator g, and the random number α is stored, for example, in the random-number storage part 245 within the storage unit 241, and is referred to by the leaf-key assigning unit 235, the parameter assigning unit 237, the encryption key calculation unit 239, and the like.

Then, the tree-structure construction unit 231 of the key generation device 20 determines the number Y of customers belonging to a divided subgroup. After determining the number X of divisions in accordance with the calculation below, the tree-structure construction unit 231 divides the customers into X subgroups. Furthermore, the tree-structure construction unit 231 constructs a Y-ary tree where each customer is assigned as a leaf (step S105). Here, n within expression 101 below represents the total number of customers.

[Math. 18]

$$X = \lceil \frac{n}{Y} \rceil \quad \text{(Expression 101)}$$

For example, as shown in FIG. 12, in a case where the total number n of customers is 9 and Y=3, that is, a ternary tree is constructed, the number X of divisions is 3, in accordance with expression 101.

The tree-structure construction unit 231 causes the Y-ary tree structure constructed as described above to be stored in the tree-structure storage part 243 within the storage unit 241.

Next, the leaf-key assigning unit 235 of the key generation device 20 calculates leaf keys g$_i$ for i (i=1, . . . , Y, Y+2, 2Y), as in the below (step S107).

[Math. 19]

$$g_i = g^{(\alpha)^i} \quad \text{(Expression 102)}$$

As is clear from expression 102 above, for calculation of the leaf key g$_i$, the generator g determined by the random-number determination unit 233 and the center-secret random number α are used. Thus, the leaf-key assigning unit 235 accesses the random-number storage part 245 within the storage unit 241 to read the data. After calculating leaf keys, the leaf-key assigning unit 235 stores the calculated leaf keys g$_i$ in the leaf-key storage part 247 within the storage unit 241.

Note that in step S107, not only is Y leaf keys g$_i$, where Y represents the number of customers belonging to a subgroup, calculated, but also leaf keys g$_i$ are calculated by changing i to 2Y except for Y+1. The reason why calculation of g$_{Y+1}$ is not performed is to ensure the security of the encryption key delivery system 10 according to this embodiment. In addition, this is because leaf keys g$_i$ from g$_{y+2}$ to g$_{2Y}$ are necessary for decryption performed in the decryption phase described later.

Then, the parameter assigning unit 237 of the encryption key creation device 20 selects, at random, random numbers γ$_{x,y}$ (γ$_{x,y}$ is an integer) corresponding to all the nodes (x,y) except for leaves. Then, the parameter assigning unit 237 calculates parameters v$_{x,y}$ as in the below, and assigns the parameters v$_{x,y}$ to individual nodes except for the leaves of the Y-ary tree (step S109). Here, x=0, . . . , H−1 (H is the height of the Y-ary tree structure), and y=1, . . . , Y$^x$.

[Math. 20]

$$v_{x,y} = g^{\gamma_{x,y}} \in G \quad \text{(Expression 103)}$$

For example, in a case where a ternary tree structure is constructed for nine customers as shown in FIG. 12, since the height H of the ternary tree structure is 2, x is 0 or 1. In addition, y is 1, 2, or 3. That is, in the case of FIG. 12, four parameters $v_{x,y}$ in total, $v_{0,1}$, $v_{1,1}$, $v_{1,2}$, and $v_{1,3}$, are assigned by the parameter assigning unit 237. Thus, also for $\gamma_{x,y}$, four integers are selected at random. On the basis of the values determined as described above, parameters are assigned to individual nodes in accordance with expression 103.

In addition, the parameters $v_{x,y}$, the node parameters $\gamma_{x,y}$, and the like calculated by the parameter assigning unit 237 are stored in the parameter storage part 249 within the storage unit 241.

Then, the leaf-key assigning unit 235 assigns $g_{x,y}$ to all the nodes except for the root (step S111). Here, $y=1, \ldots, Y^x$, and $g_{x,y}$ represents elements of a set $\{g_1, \ldots, g_y\}$ constituted of $g_1, \ldots, g_Y$. As described above, the leaf-key assigning unit 235 has both the function of calculating leaf keys $g_y$ and the function of assigning the calculated leaf keys to all the nodes except for the root. The results of assigning are stored, in association with the tree structure, in the leaf-key storage part 247 within the storage unit 241.

As an example, the case shown in FIG. 12 will be considered. In this case, three child nodes for which the root servers as a parent node exist in the Layer1 (503) to form a subgroup. Thus, $g_1$ is assigned as $g_{1,1}$ to the node (1,1), $g_2$ is assigned as $g_{1,2}$ to the node (1,2), and $g_3$ is assigned as $g_{1,3}$ to the node (1,3).

In addition, when the Layer2 (505) is considered, three subgroups in total, a subgroup constituted by three nodes (2,1), (2,2), and (2,3) for which the node (1,1) serves as a parent node, a subgroup constituted by three child nodes (2,4), (2,5), and (2,6) for which the node (1,2) serves as a parent node, and a subgroup constituted by three child nodes (2,7), (2,8), and (2,9) for which the node (1,3) serves as a parent node, exist. In this case, $g_1$ is assigned as $g_{2,1}$ to the node (2,1), $g_2$ is assigned as $g_{2,2}$ to the node (2,2), and $g_3$ is assigned as $g_{2,3}$ to the node (2,3). Similarly, $g_1$ is assigned as $g_{2,4}$ to the node (2,4), $g_2$ is assigned as $g_{2,5}$ to the node (2,5), and $g_3$ is assigned as $g_{2,6}$ to the node (2,6). In addition, $g_1$ is assigned as $g_{2,7}$ to the node (2,7), $g_2$ is assigned as $g_{2,8}$ to the node (2,8), and $g_3$ is assigned as $g_{2,9}$ to the node (2,9).

Then, the key calculation unit 239 of the key generation device 20 forms a public key PK as in the below, and publishes the public key PK via the public-key publishing part 255 (step S113).

$$PK = (g, g_1, \ldots, g_Y, g_{Y+2}, \ldots, g_{2Y}, v_{0,1}, \ldots, v_{H-1,X}) \quad \text{(Expression 104)}$$

As is clear from expression 104 above, the public key PK is constituted by the generator g determined by the random-number determination unit 233, the leaf keys $g_i$ calculated by the leaf-key assigning unit 235, and the parameters $v_{x,y}$ calculated by the parameter assigning unit 237. Thus, the key calculation unit 239 forms the public key PK by referring to each of the storage parts 245, 247, and 249 within the storage unit 241. The key calculation unit 239 stores the formed public key PK in the key storage part 251 within the storage unit 241. The public-key publishing part 255 refers to the key storage part 251 to publish the public key. Note that the key calculation unit 239 may transmit the formed public key PK directly to the public-key publishing part 255.

As an example, the case shown in FIG. 12 will be considered. In this case, (g, $g_1$, $g_2$, $g_3$, $g_5$, $g_6$, $v_{0,1}$, $v_{1,1}$, $v_{1,2}$, $v_{1,3}$) is published as the public key PK.

Then, the key calculation unit 239 identifies, for a customer i (i=1, \ldots, n), a path extending from the root to a leaf assigned to the customer i, and sets the index of a customer i for a node in a Layer x in the path to $i_x$. That is, $i_0 = (0,1)$ and $i_H = (H,i)$. The center identifies, for all the nodes $i_1, \ldots, i_H$ assigned to customers i except for the root, parameters $g_{ix}$ assigned to these nodes. In addition, the center identifies parameters $\gamma_{ix}$ assigned to all the nodes $i_0, \ldots, i_{H-1}$ except for the leaves, and calculates private secret keys $d_i$ for the customers i as in the below. After that, the transmission part 253 delivers the private secret keys $d_i$ to the customers i by using secure communication channels (step S115).

[Math. 21]

$$d_i = \{g_{i_1}^{\gamma_{i_0}}, \ldots, g_{i_H}^{\gamma_{i_{H-1}}}\} = \{v_{i_0}^{a^{i_1}}, \ldots, v_{i_{H-1}}^{a^{i_H}}\} \in G^H \quad \text{(Expression 105)}$$

As is clear from expression 105, individual elements of a private secret key $d_i$ are calculated on the basis of a leaf key $g_{ix}$ assigned to a node $i_x$ in an identified path and a parameter $\gamma_{ix-1}$ assigned to a node serving as a parent node of the node $i_x$. That is, it can be said that each private secret key $d_i$ is a set of keys calculated on the basis of a leaf key assigned to each node. Note that hereinafter, a specific example of step S115 mentioned above will be described in detail with reference to FIG. 15.

Note that when private secret keys $d_i$ unique to individual customers are calculated in the key calculation unit 239, the key calculation unit 239 stores these private secret keys in the key storage part 251 within the storage unit 241. In a case where the transmission part 253 transmits a private secret key $d_i$ to each customer, the transmission part 253 acquires necessary information by referring to the key storage part 251 within the storage unit 241. In addition, the key calculation unit 239 may pass a generated private secret key directly to the transmission part 253.

Figure 15:
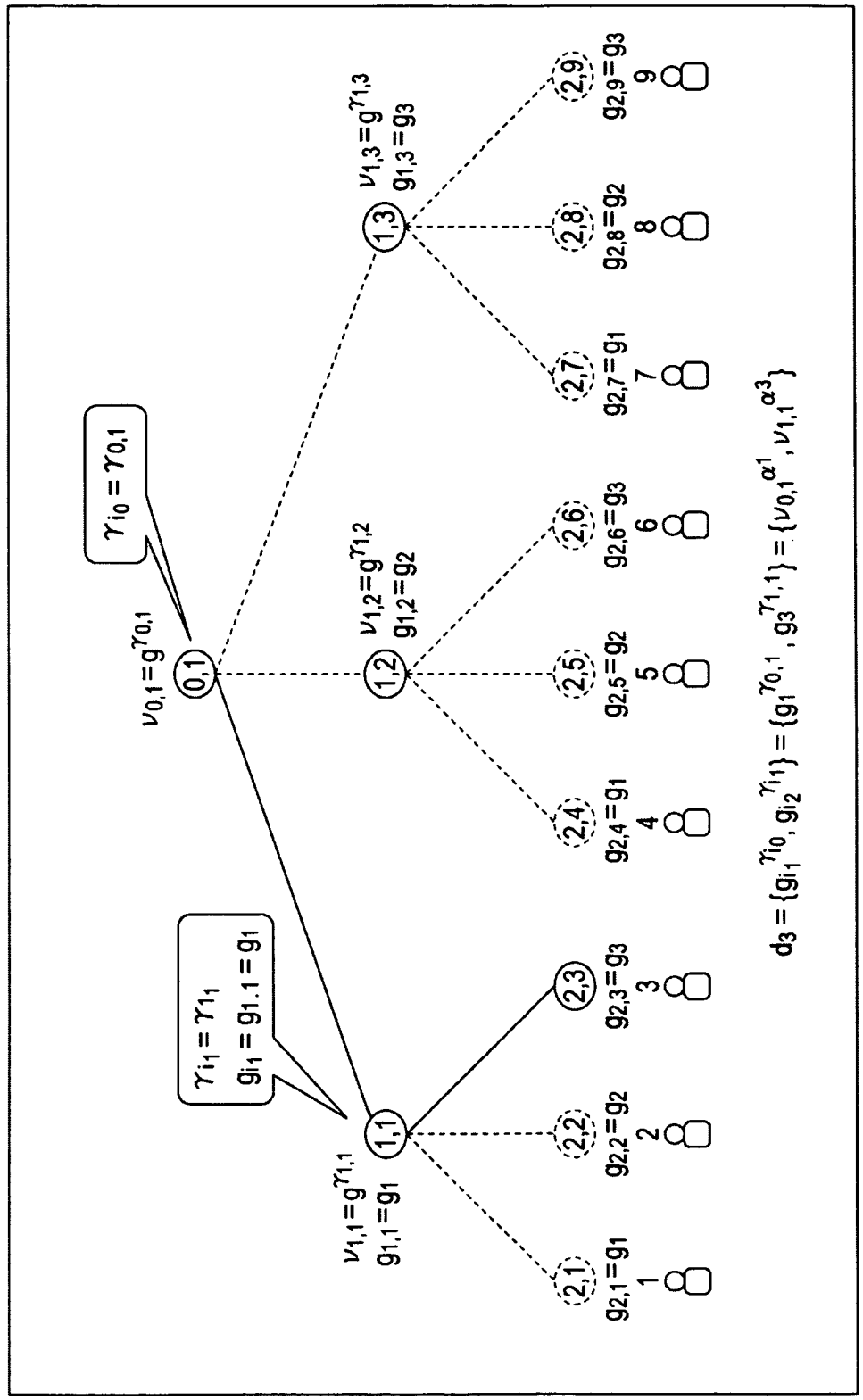
FIG. 15 is an explanatory diagram for explaining a specific example of key generation according to the embodiment.

Now, a specific example of step S115 mentioned above will be exemplified with reference to FIG. 15. In FIG. 15, a ternary tree structure is constructed for nine customers. Here, a case where a private secret key $d_3$ is transmitted to a customer 3 who is assigned to a leaf (2,3) will be considered.

A path extending from the root (0,1) to the leaf (2,3), which represents the customer 3, is a path extending from the root (0,1) via an intermediate node (1,1) to the leaf (2,3). In this case, (1,1) and (2,3), which are the nodes in the path except for the root (0,1), are represented by and $i_2$, respectively. Here, parameters assigned to the individual nodes (0,1), (1,1), and (2,3) are considered. To the node (0,1), $\gamma_{0,1}$ is assigned as $\gamma_{i0}$. To the node (1,1), $\gamma_{I,1}$ is assigned as $\gamma_{i1}$, and $g_I$, which is represented by $g_{1,1}$, is assigned as $g_{i1}$. In addition, to the leaf (2,3), $g_3$, which is represented by $g_{2,3}$, is assigned as $g_{i2}$.

In accordance with expression 105, the private secret key $d_3$ to be kept by the customer 3 is a set of a result obtained by raising the leaf key $g_1$ assigned to the node (1,1) to the power of $\gamma_{0,1}$ assigned to the root (0,1), which is a parent node of the node (1,1), and a result obtained by raising the leaf key $g_3$ assigned to the leaf (2,3) to the power of $\gamma_{I,1}$ assigned to the node (1,1), which is a parent node of the leaf (2,3).

As described above, as shown in FIG. 13, regarding the key generation device 20 according to this embodiment, the key generation device 20 owned by a center 509 selects a bilinear group G and various parameters, and generates a public key PK and a private secret key $d_i$ unique to a customer. Then, the center 509 publishes the public key PK and delivers the private secret key $d_i$ to each customer 507 by using a secure one-to-one communication channel 511.

<Operation of Encryption Device 30: Encryption Phase>

Figure 16:
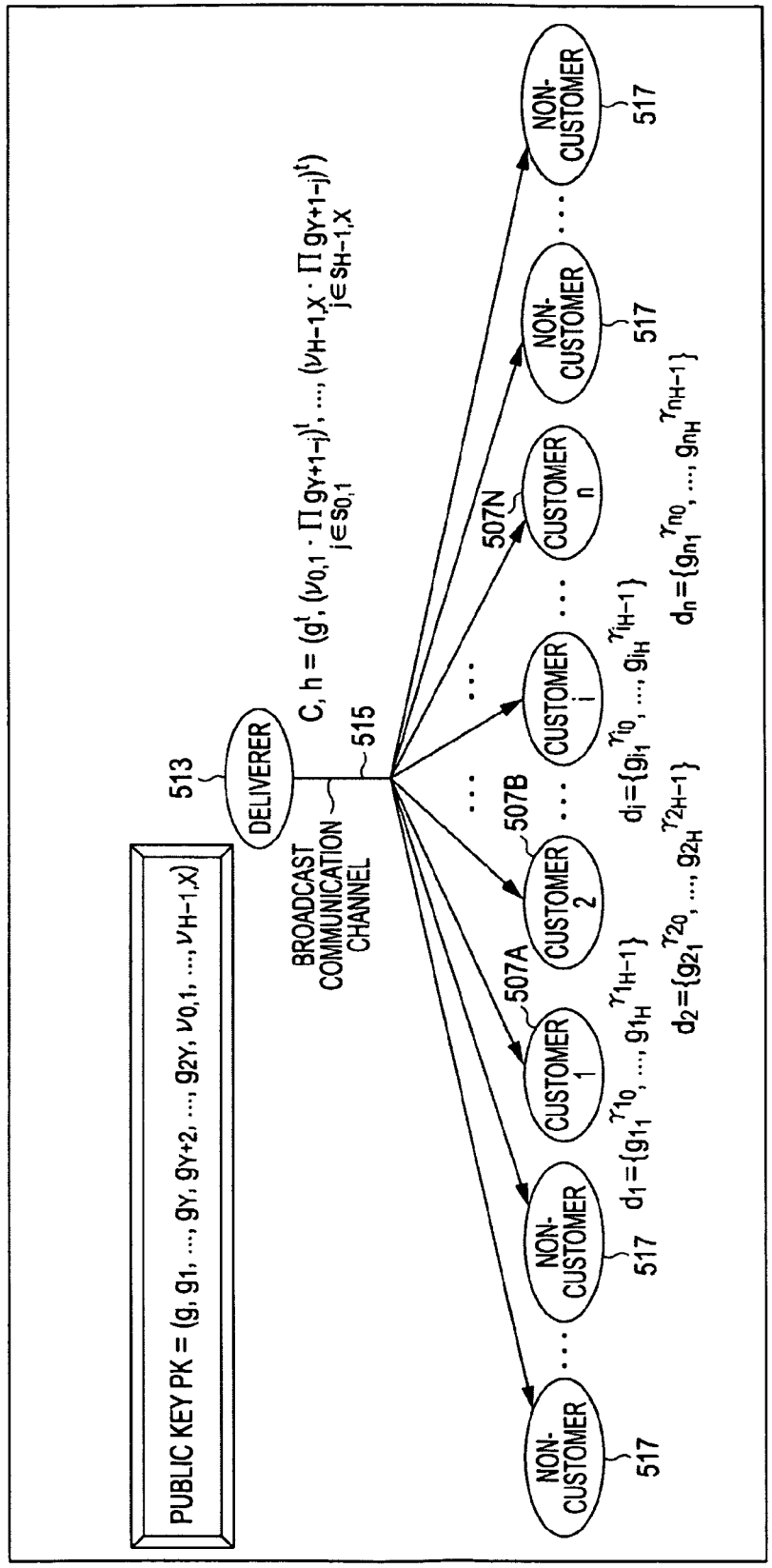
FIG. 16 is an explanatory diagram for explaining the overview of encryption according to the embodiment.
Figure 17:
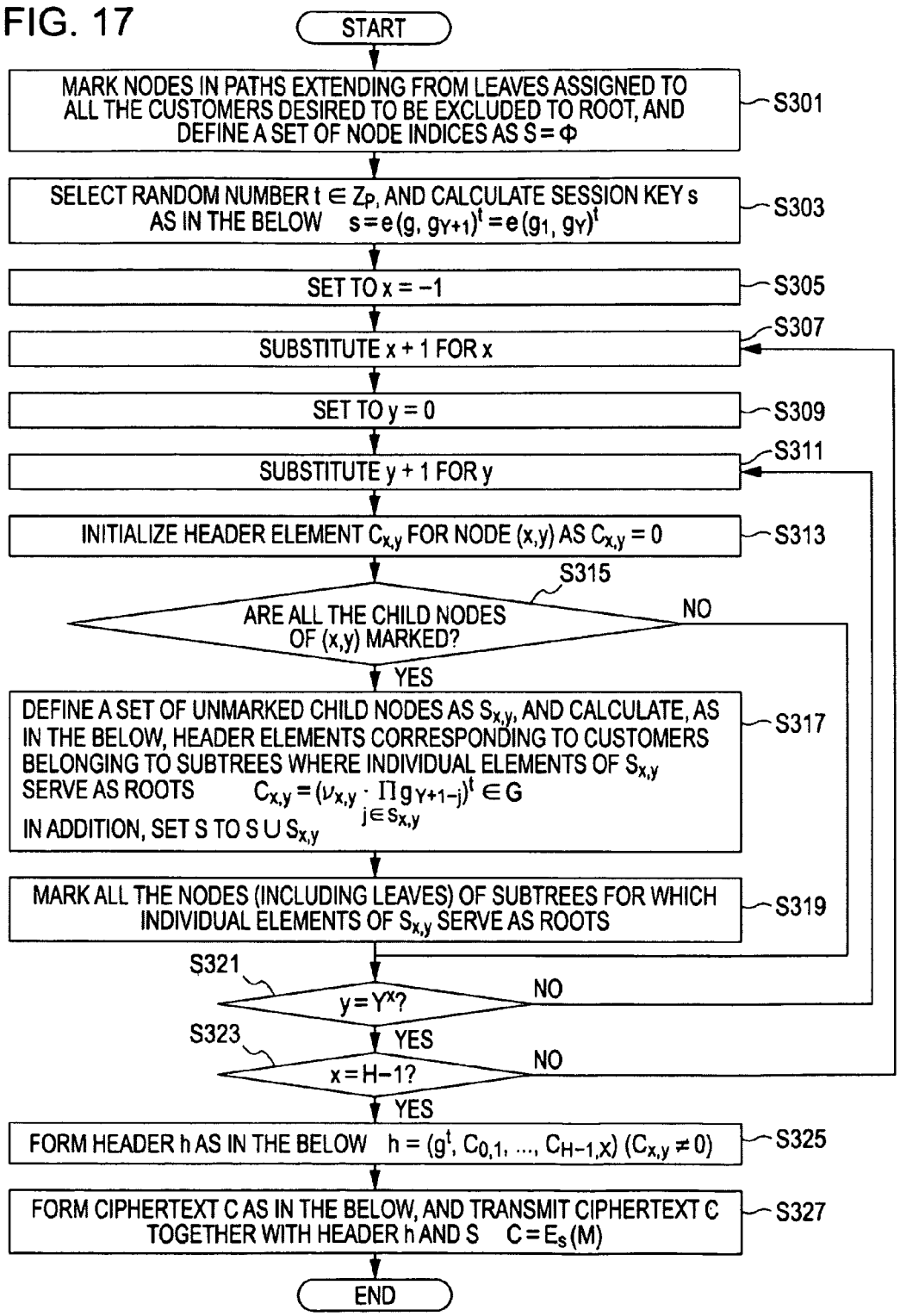
FIG. 17 is a flowchart for explaining an encryption phase according to the embodiment.

Now, an operation of the encryption device 30 according to this embodiment, that is, the encryption phase, will be described in detail with reference to FIGS. 16 and 17. FIG. 16 is an explanatory diagram for explaining the overview of encryption by the encryption device 30. FIG. 17 is a flowchart of the encryption phase by the encryption device 30. Note that the encryption phase described below can be performed by any third party who owns the encryption device 30. In addition, even an owner of the key generation device 20 or an owner of the reception device 40 is able to perform the encryption phase below as long as the owner of the key generation device 20 or the owner of the reception device 40 is an owner of the encryption device 30.

Prior to execution of the encryption phase described below, the reception unit 301 of the encryption device 30 receives each of a public key generated and published by the key generation device 20, a prime p, information on a tree structure, and information on a set S of non-excluded reception devices. Such information received by the reception unit 301 is stored in the storage unit 303. Such information stored in the storage unit 303 can be freely read by each processing unit of the encryption device 30.

First, the excluded reception device identification unit 305 marks all the nodes in paths extending from leaves assigned to all the customers desired to be excluded to the root, and initializes a set S of node indices used by non-excluded customers to identify header elements assigned to the non-excluded customers from a header h as S=(φ) (φ represents an empty set) (step S301).

Then, the session-key determination unit 307 selects, at random, an arbitrary integer t, and calculates a session key s as in the below (step S303).

$$s = e(g_{Y+1}, g)^t = e(g_Y, g_1)^t \qquad \text{(Expression 106)}$$

Then, the header-element calculation part 309 sets x, which is a parameter representing a layer, to −1 (step S305). That is, step S305 is a step of initializing the parameter x representing a layer.

Then, the header-element calculation part 309 substitutes x+1 for x to increase the value of x by one (step S307).

Next, the header-element calculation part 309 sets y to zero to initialize a parameter (step S309).

Then, the header-element calculation part 309 substitutes y+1 for y, which is a parameter representing the position of a node in each layer, to increase the value of y by one (step S311).

Next, the header-element calculation part 309 initializes a header element $c_{x,y}$, which corresponds to a node (x, y), as $c_{x,y}=0$ (step S313).

In accordance with the steps described below, the header-element calculation part 309 performs specific processing for calculating header elements.

Then, the header-element calculation part 309 determines whether or not all the child nodes of the node (x,y) are marked (step S315). As a result of the determination, in a case where all the child nodes are marked, the header-element calculation part 309 proceeds to step S321 described below. Meanwhile, in a case where an unmarked child node exists, the header-element calculation part 309 proceeds to step S317 described below.

Next, the header-element calculation part 309 defines a set of unmarked child nodes as $S_{x,y}$, and calculates, as in the below, header elements corresponding to customers belonging to subtrees (subgroups) where individual elements of $S_{x,y}$ serve as roots (step S317).

[Math. 22]

$$c_{x,y} = \left( v_{x,y} \cdot \prod_{j \in S_{x,y}} g_{Y+1-j} \right)^t \in G \qquad \text{(Expression 107)}$$

In addition, the header-element calculation part 309 sets the set S as in the below (step S317).

[Math. 23]

$$S \cup S_{x,y} \qquad \text{(Expression 108)}$$

Next, the header-element calculation part 309 marks all the nodes (including leaves) belonging to the subtrees where the individual elements of $S_{x,y}$ serve as roots (step S319).

Then, the header-element calculation part 309 determines whether or not a parameter y to which attention is currently being paid corresponds to $Y^x$ (step S321). As a result of the determination, in a case where y is $Y^x$, the header-element calculation part 309 proceeds to step S323 described below. Meanwhile, in a case where y is not $Y^x$, the header-element calculation part 309 returns to step S311 to increase the parameter y by one.

Next, the header-element calculation part 309 determines whether or not a parameter x to which attention is currently being paid is H−1 (step S323). As a result of the determination, in a case where x is H−1, the header-element calculation part 309 proceeds to step S325 described below. Meanwhile, in a case where x is not H−1, the header-element calculation part 309 returns to step S307 to increase the parameter x by one.

As described above, by repeating steps S307 to S323 until both the conditions of step S321 and step S323 are satisfied, the header-element calculation part 309 is capable of calculating all the header elements necessary for generation of a header.

That is, since prior to specific calculation for header elements, a header element $c_{x,y}$, which corresponds to a node (x,y) to which attention is being paid, is initialized to zero in step S313, in a case where all the child nodes of the node (x,y) to which attention is being paid are marked in step S315, a header element $c_{x,y}$ for the node (x,y) is maintained zero and stored. Meanwhile, in a case where all the child nodes of the node (x,y) to which attention is being paid are not marked, a new value is substituted for $c_{x,y}$ in step S317. Thus, $c_{x,y}$ has a value which is not zero.

The header-element calculation part 309 passes all the header elements acquired by repetition of the above-described steps to the header information generation part 311. In addition, the header-element calculation part 309 may store the calculated header elements in the storage unit 303.

Then, the header information generation part 311 calculates $g^t$ by using a generator g and t selected in step S303. In addition, the header information generation part 311 forms a header h, as in the below, by using only header elements $c_{x,y}$ having values that are not zero (step S325).

$$h = (g^t, c_{0,1}, \ldots, C_{H-1,X})(C_{x,y} \neq 0) \qquad \text{(Expression 109)}$$

After generating header information, the header information generation part 311 passes the generated header h to the encryption unit 315. In addition, the header information generation part 311 may store the generated h in the storage unit 303.

Then, the encryption unit 315 receives from the content storage unit 313 unencrypted content M to be delivered, and encrypts the content M, as in the below, by using a session key s determined by the session-key determination unit 307. After that, the content transmission unit 317 transmits the encrypted content C, together with the header h generated by the header information generation part 311 and the set S of the node indices, to customers (step S327).

$$C = E_s(M) \quad \text{(Expression 110)}$$

Figure 18:
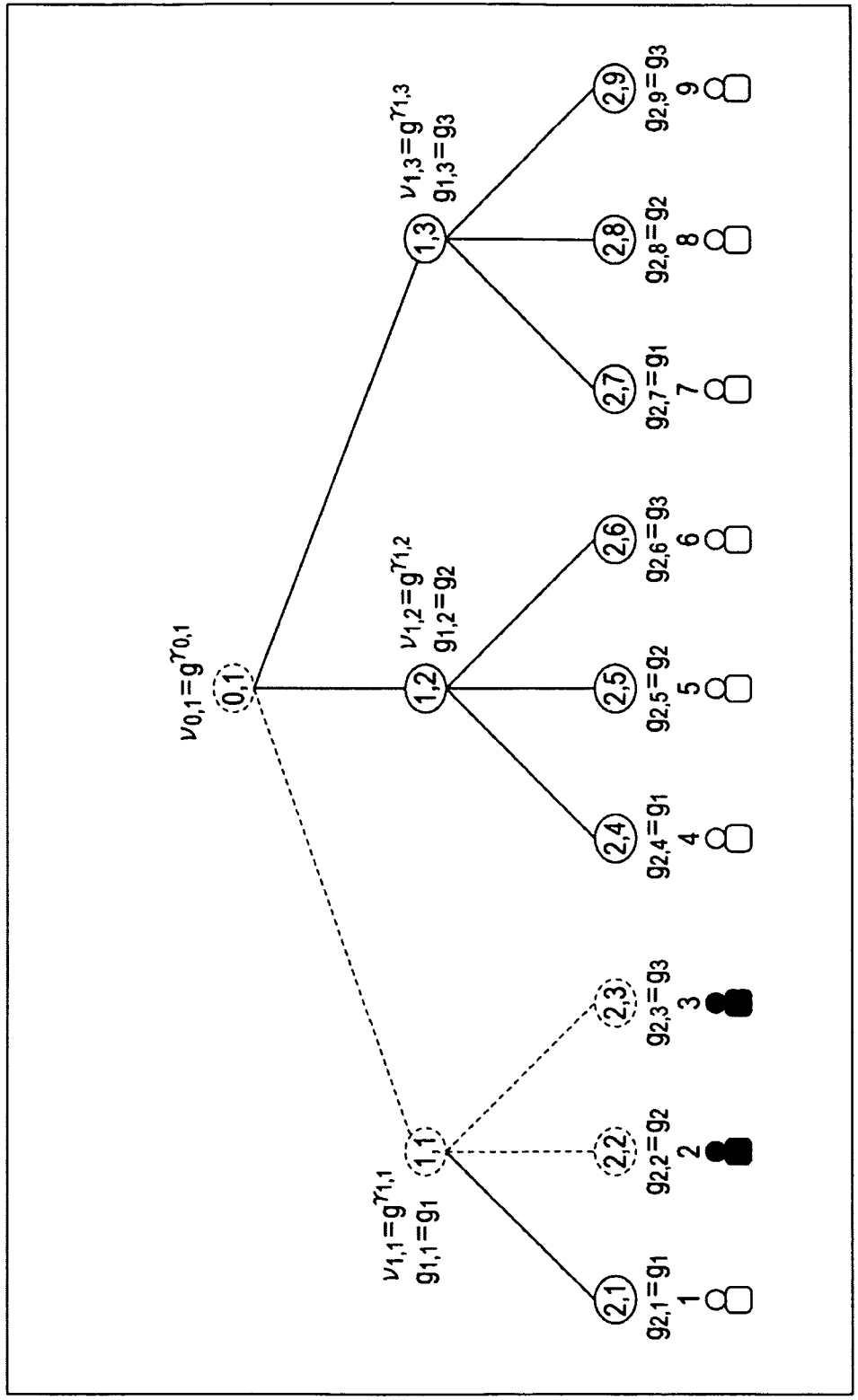
FIG. 18 is an explanatory diagram for explaining a specific example of encryption according to the embodiment.
Figure 19:
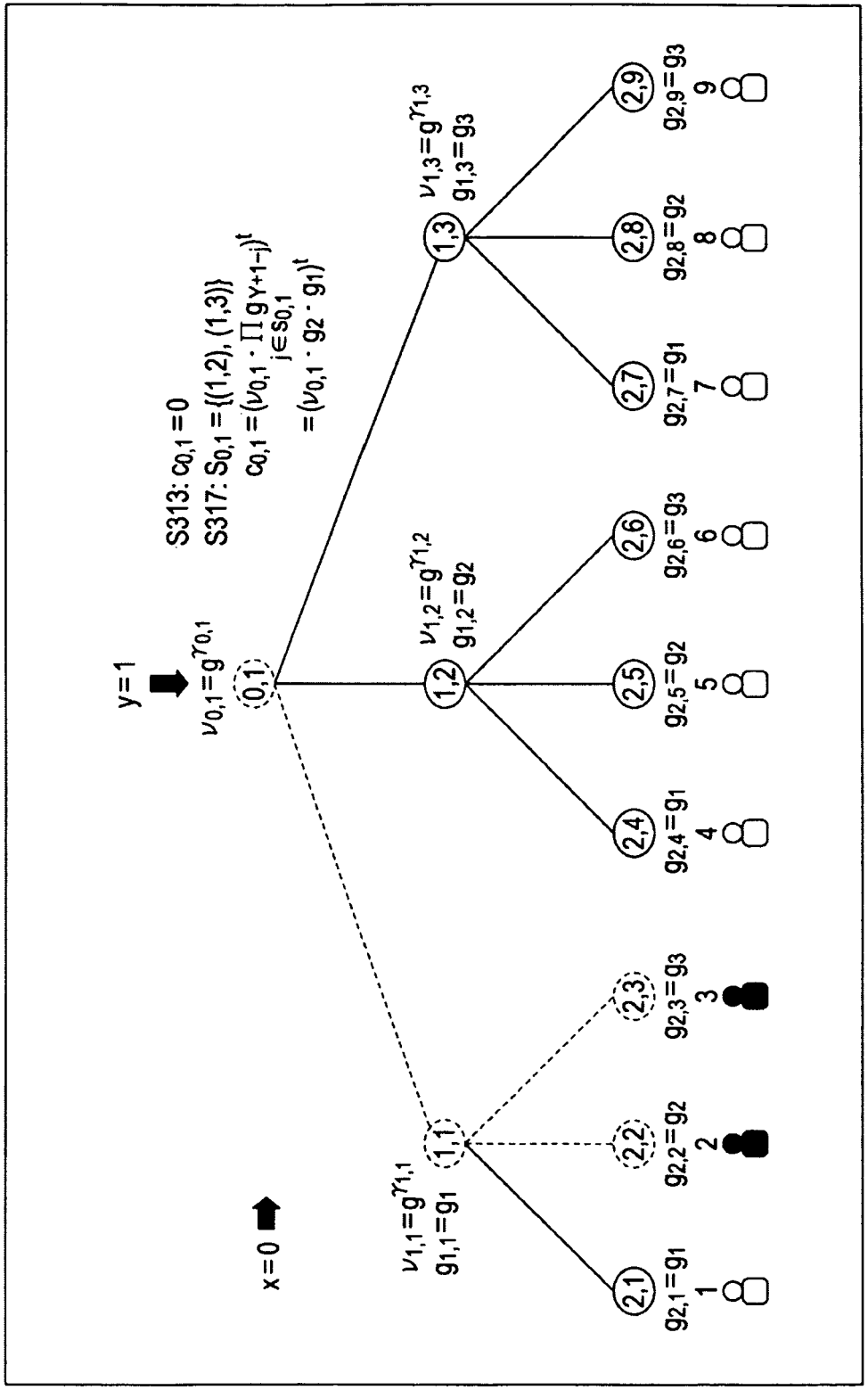
FIG. 19 is an explanatory diagram for explaining a specific example of encryption according to the embodiment.
Figure 20:
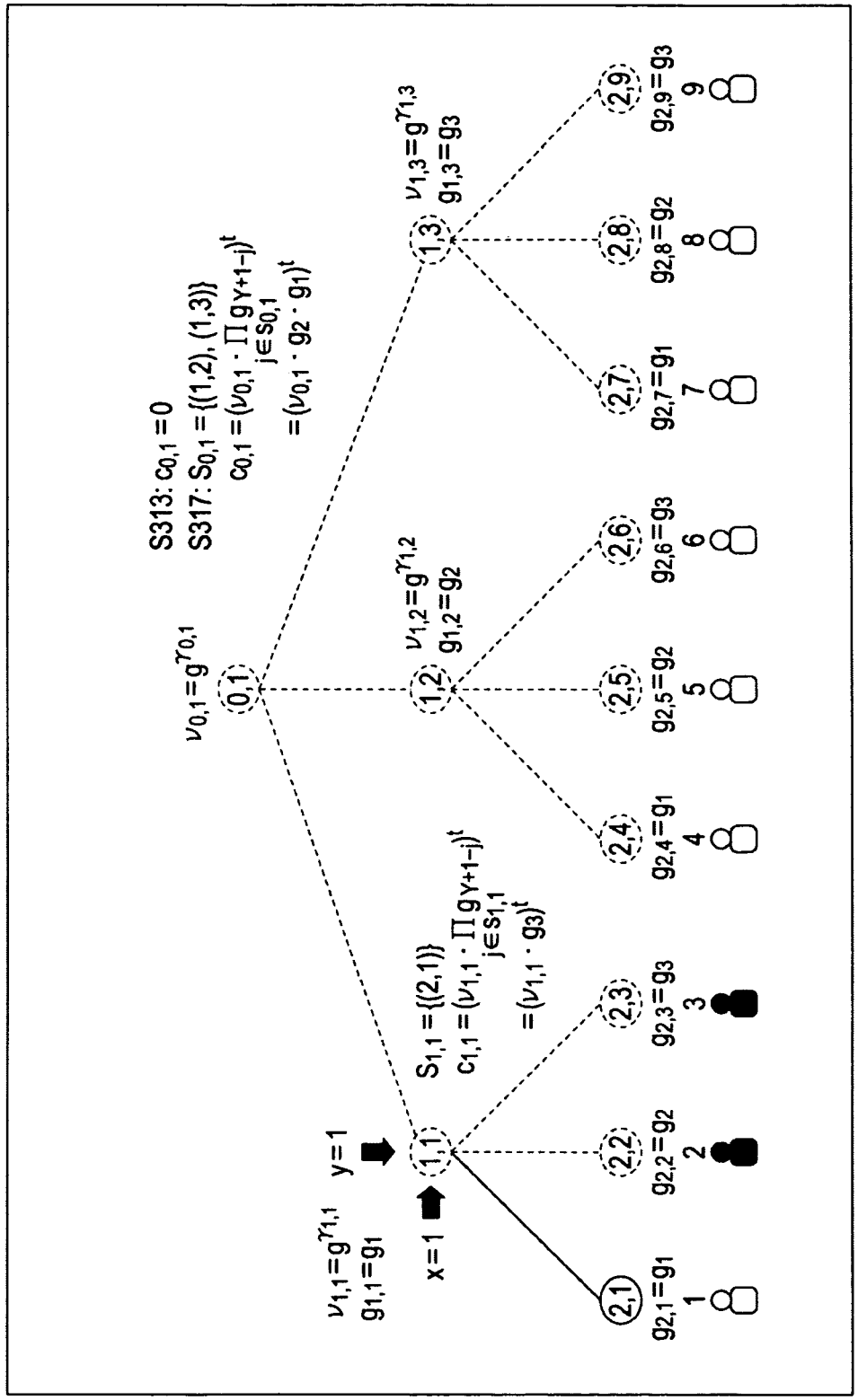
FIG. 20 is an explanatory diagram for explaining a specific example of encryption according to the embodiment.

Now, the encryption phase according to this embodiment will be described specifically with reference to FIGS. 18 to 20. FIGS. 18 to 20 are explanatory diagrams for specifically explaining the encryption phase according to this embodiment. In FIGS. 18 to 20, a case where a ternary tree structure is constructed and nine customers are assigned to leaves is shown.

In the example below, a case where customers desired to be excluded are a customer 2 and a customer 3 will be described. As shown in FIG. 18, a leaf (2,2) is assigned to the customer 2 and a leaf (2,3) is assigned to the customer 3. In this case, a path extending from the customer 2, who is desired to be excluded, to the root is a path, which is indicated by a dotted line in FIG. 18, extending from the leaf (2,2) via a node (1,1) to the root (0,1). Similarly, a path extending from the customer 3, which is desired to be excluded, to the root is a path, which is indicated by a dotted line in FIG. 18, extending from the leaf (2,3) via the node (1,1) to the root (0,1). In this case, an excluded reception device identification unit 261 marks the root (0,1), the node (1,1), the leaf (2,2), and the leaf (2,3). Note that in FIG. 18, the marked nodes are shown in such a manner that the marked nodes are encircled with dotted lines. After that, step S303 is performed by the session-key determination unit 307, and a session key s is determined.

Then, steps S305 to S311 are performed by the header-element calculation part 309. As a result, 0 is substituted for the parameter x, and 1 is substituted for the parameter y. Then, the header-element calculation part 309 performs step S313. In this case, a header element $c_{0,1}$, which corresponds to the node (0,1), is initialized to zero. Then, the header-element calculation part 309 performs step S315 to determine whether or not all the child nodes of the root (0,1) are marked. As is clear from FIG. 19, there are three child nodes (1,1), (1,2), and (1,3) of the root (0,1), and the nodes (1,2) and (1,3) are not marked. Thus, the header-element calculation part 309 performs step S317.

In the case of FIG. 19, a set $S_{0,1}$ of unmarked child nodes is $\{(1,2), (1,3)\}$. In addition, since $g_2$ and $g_3$ are assigned to the nodes (1,2) and (1,3), respectively, the header element $c_{0,1}$ is calculated as $(v0,1 \cdot g_2 \cdot_1)^t$.

Then, the header-element calculation part 309 performs step S319. By step S319, a node (1,2), a leaf (2,4), a leaf (2,5), and a leaf (2,6), which are all the nodes of a subtree where the node (1,2), which is an element of $S_{0,1}$, serves as a root, are marked. For a node (1,3), which is another element of $S_{0,1}$, similarly, a node (1,3), a leaf (2,7), a leaf (2,8), and a leaf (2,9) are marked.

Since the determination in step S321 by the header-element calculation part 309 is y=1, the condition is met. Thus, subsequently, the header-element calculation part 309 performs the determination in step S323. In this case, since x=0≠1, the branch condition is not met. Thus, the header-element calculation part 309 returns to step S307 to repeat the process by setting to x=1.

Processes from returned step S307 to step S311 are performed again in order. By this time, 1 has been substituted for x and 1 has been substituted for y. Thus, next, similar processing is performed for the node (1,1).

In this case, a set $S_{1,1}$ of unmarked child nodes of the node (1,1) is only $\{(2,1)\}$. Similarly, calculation of a header element is performed, and $(v_{1,1} \cdot g_3)^t$ is calculated as a header element $c_{1,1}$. Then, since all the nodes of a subtree where the node (1,1) serves as a root are marked, the leaf (2,1), which has not been marked, is now marked.

As a result, all the nodes of the ternary tree structure including the root and the leaves are marked. Thus, in the determination of step S323, the branch condition is met.

By the above-described process, the header information generation part 311 forms a header h by using header elements $c_{x,y}$ having values that are not zero, that is, $c_{0,1}$ and $c_{1,1}$. Thus, as a header h, $(g^t, c_{0,1}, c_{1,1})$ is formed. In addition, S, which indicates a set of customers who are able to decrypt delivered content, is $\{(1,2), (1,3), (2,1)\}$, by the process described above.

As described above, in the encryption content delivery block according to this embodiment, a deliverer 513 calculates a session key s and a header h by using a public key PK and a random number t selected by the deliverer 513, as shown in FIG. 16. At the same time, the deliverer 513 also determines a set S of customers who are able to decrypt content. Then, the deliverer 513 delivers the encrypted content C, the header h, and the set S, irrespective of whether the customers 507 or non-customers 517, via a broadcast communication channel 515.

<Operation of Reception Device 40: Decryption Phase>

Figure 21:
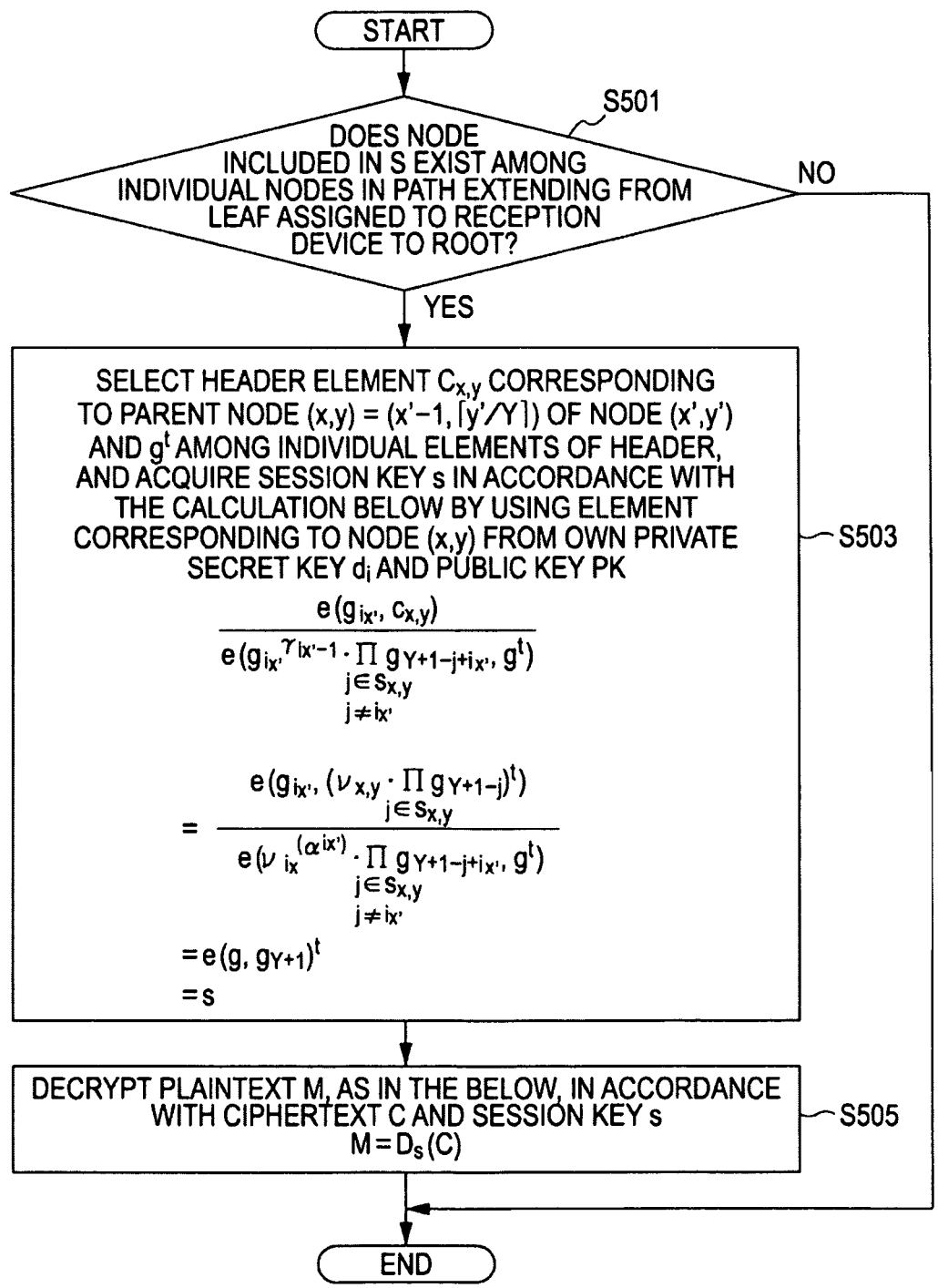
FIG. 21 is a flowchart for explaining a decryption phase according to the embodiment.

Now, an operation of the reception device 40 according to this embodiment, that is, the decryption phase, will be described in detail with reference to FIG. 21. FIG. 21 is a flowchart of the decryption phase, which is a key processing method by the reception device 40.

First, the reception device 40 that receives encrypted content C, a header h, and a set S by the reception unit 401 temporarily stores the information in the storage unit 403. After that, decryption processing of the encrypted content C is performed.

First, the determination unit 405 of the reception device 40 refers to the set S stored in the storage unit 403 to determine whether or not a node included in the set S exists among individual nodes from a leaf assigned to the reception device 40 to the root (step S501). As a result of the determination, in a case where no node included in the set S exists, the determination unit 405 determines that the reception device 40 is excluded, and terminates the decryption process described below. Meanwhile, as a result of the determination, in a case where a node included in the set S exists, the reception device 40 sets the node index of the node included in the set S to (x',y'), and performs step S503 below.

The decryption unit 407 of the reception device 40 selects a header element $c_{x,y}$ corresponding to a parent node (x,y) of the node (x',y') and $g^t$ among individual elements of the header h received by the reception unit 401 and stored in the storage unit 403 (step S503). Here, the parent node (x,y) of the node (x',y') is represented by the expression below.

[Math. 24]

$$(x, y) = \left(x' - 1, \left\lceil \frac{y'}{y} \right\rceil \right) \quad \text{(Expression 111)}$$

In addition, the decryption unit 407 acquires the session key s, as in the below, by using the public key and an element corresponding to the node (x',y') from the private secret key $d_i$ for the reception device 40 (step S503).

[Math. 25]

$$s = \frac{e(g_{i_{x'}}, c_{x,y})}{e\left(g_{i_{x'}}^{\gamma_{i_{x'}}-1} \cdot \prod_{\substack{j \in S_{x,y} \\ j \neq i_{x'}}} g_{Y+1-j+1_{x'}}, g^t\right)} \quad \text{(Expression 112-1)}$$

$$= \frac{e\left(g_{i_{x'}}, \left(v_{x,y} \cdot \prod_{\substack{j \in S_{x,y}}} g_{Y+1-j}\right)^t\right)}{e\left(v_{i_x}^{(\alpha^{i_{x'}})} \cdot \prod_{\substack{j \in S_{x,y} \\ j \neq i_{x'}}} g_{Y+1-j+1_{x'}}, g^t\right)} \quad \text{(Expression 112-2)}$$

$$e(g_{i_{x'}}, g^t_{Y+1-i_{x'}}) \cdot \quad \text{(Expression 112-3)}$$

$$= \frac{e\left(g_{i_{x'}}, \left(v_{i_x} \cdot \prod_{\substack{j \in S_{x,y} \\ j \neq i_{x'}}} g_{Y-1-j}\right)^t\right)}{e\left(v_{i_x}^{(\alpha^{i_{x'}})} \cdot \prod_{\substack{j \in S_{x,y} \\ j \neq i_{x'}}} g_{Y+1-j+i_{x'}}, g^t\right)}$$

$$e(g, g_{Y+1})^t \cdot \quad \text{(Expression 112-4)}$$

$$= \frac{e\left(g^t, \left(v_{i_x}^{(\alpha^{i_{x'}})} \cdot \prod_{\substack{j \in S_{x,y} \\ j \neq i_{x'}}} g_{Y+1-j+i_{x'}}\right)^t\right)}{e\left(v_{i_x}^{(\alpha^{i_{x'}})} \cdot \prod_{\substack{j \in S_{x,y} \\ j \neq i_{x'}}} g_{Y+1-j+1_{x'}}, g^t\right)}$$

$$= e(g, g_{Y+1})^t \quad \text{(Expression 112-5)}$$

Then, the decryption unit 407 decrypts the encrypted content C to obtain plaintext M by using the acquired session key s (step S505).

$$M = D_s(C) \quad \text{(Expression 113)}$$

Figure 22:
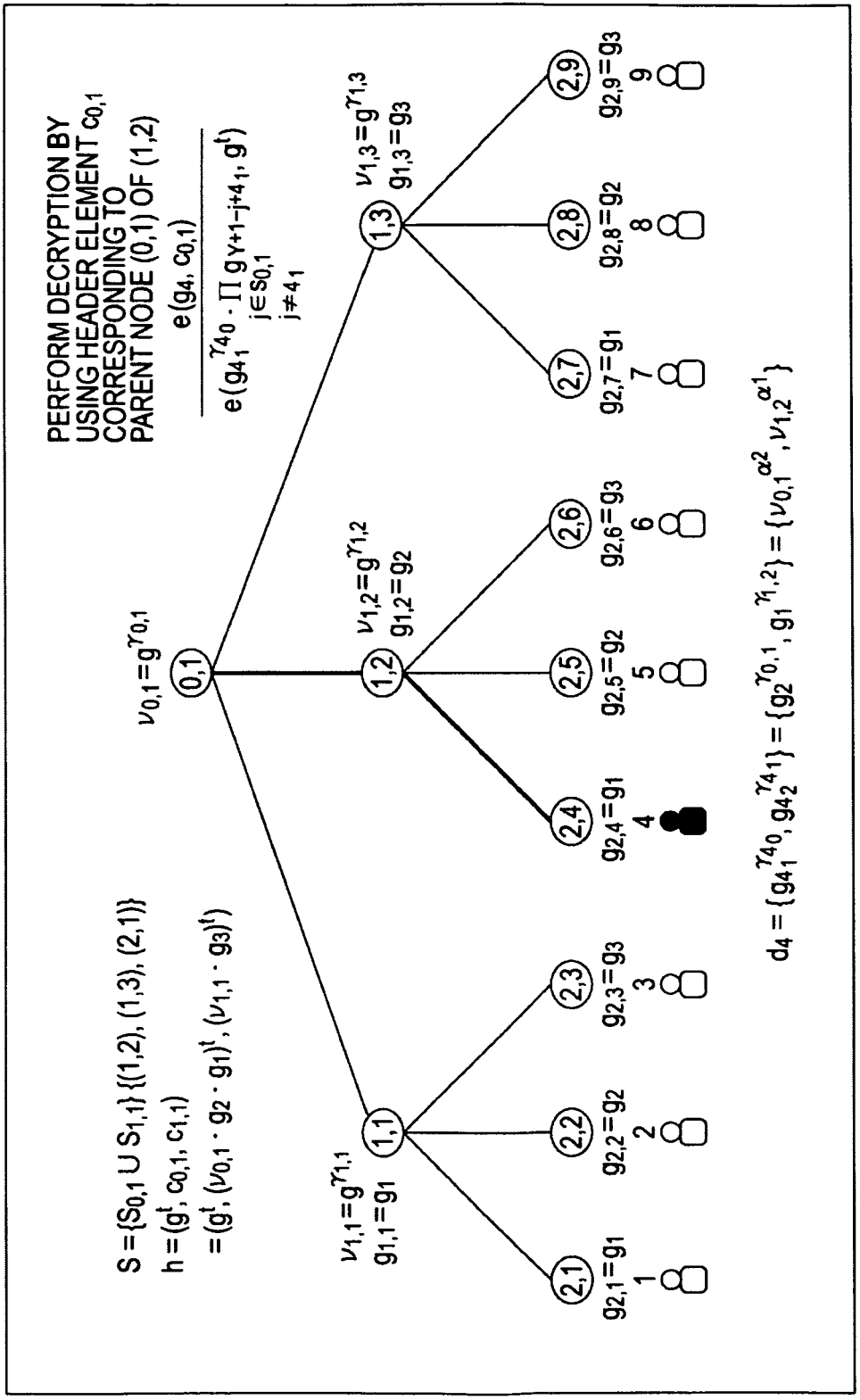
FIG. 22 is an explanatory diagram for explaining a specific example of decryption according to the embodiment.

Then, the decryption phase according to this embodiment will be specifically described with reference to FIG. 22. FIG. 22 is an explanatory diagram for specifically explaining the decryption phase according to this embodiment. In FIG. 22, a case where a ternary tree structure is constructed and nine customers are assigned to leaves is shown.

In the example below, a case where customers desired to be excluded are a customer 2 and a customer 3 and encrypted content C, a header h, and a set S are delivered to the customers 1 to 9 is assumed. Hereinafter, a case where a customer 4 who is assigned to a leaf (2,4) decrypts delivered content will be described in detail.

In the case of FIG. 22, nodes included in a path extending from the leaf (2,4) assigned to the customer 4 to the root (0,1) are the above-mentioned leaf (2,4), the node (1,2), and the root (0,1). Here, the determination unit 405 of the reception device 40 being used by the customer 4 determines whether or not the above-mentioned three nodes are included in information on the set S received by the reception unit 401.

In the case of FIG. 22, since the customer 2 and the customer 3 are customers desired to be excluded, the set S is {(1,2), (1,3), (2,1)}. As is clear from this, the node (1,2), which is a parent node of the leaf (2,4) to which the customer 4 is assigned, is included in the set S. Thus, the determination unit 405 determines that the branch condition of step S501 is met. The decryption unit 407 continues to perform the decryption process.

In this case, the node (x',y') in step S503 corresponds to the node (1,2). Thus, the parent node (x,y) of the node (x',y') is the root (0,1). The decryption unit 407 selects a header element $c_{0,1}$ corresponding to the node (0,1) and $g^t$. In addition, the decryption unit 407 calculates a session key s by using an element relating to $v_{0,1}$, which is an element corresponding to the node (0,1) from a private secret key $d_4$ for the customer 4, and a public key PK. Specifically, a bilinear map to obtain a session key s is represented by the expression below.

[Math. 26]

$$s = \frac{e(g_{4_1}, c_{0,1})}{e\left(g_{4_1}^{\gamma_{4_0}} \cdot \prod_{\substack{j \in S_{0,1} \\ j \neq 4_1}} g_{Y+1-j+4_{1'}}, g^t\right)}$$

In the above, an example of three phases, key generation, encryption, and decryption, in the encryption key delivery system 10 according to this embodiment has been described in detail.

Note that a computer program for causing a computer to function as the key generation device 20, the encryption device 30, and the reception device 40 according to this embodiment described above can be created. By being stored in a storage unit provided in the computer and being read and executed by a CPU provided in the computer, the computer program causes the computer to function as the key generation device 20, the encryption device 30, and the reception device 40 described above. In addition, a computer-readable recording medium having the computer program recorded thereon can also be provided. The recording medium is, for example, a magnetic disk, an optical disk, a magneto-optical disk, a flash memory, or the like. In addition, the computer program described above may be delivered via, for example, a network, without using the recording medium.

Now, hereinafter, the encryption key delivery system 10 according to this embodiment is compared with the content delivery system described in non-patent document 1, which is a fundamental technology.

The method of non-patent document 1, which is a fundamental technology, is a method in which a collusion program is solved by using a bilinear map in a content delivery system using a public key. In this method, customers are divided into a plurality of subgroups in advance, and at the time of delivery of content, a header including all the header elements different depending on the subgroup is delivered. Thus, even in a case where the number of excluded customers increases, the header size can be maintained constant. However, even in a case assumed for the realistic content delivery system, such as a case where no excluded customer exists or a case where the number of excluded customers is small, a header having a constant size must be always delivered. Thus, a problem exists in that delivery efficiency is degraded.

In addition, another problem exists in that in a case where the number B of customers belonging to a divided subgroup is large or a case where the number of excluded customers in a subgroup to which a customer belongs is small, the calculation amount of an operation that the customer needs to perform at the time of decryption increases.

Meanwhile, in the key generation device according to this embodiment, by constructing a logical tree using the method of the fundamental technology and letting the number of parameters to slightly increase, subgroups can be configured flexibly. In particular, in a case where no excluded customer exists or the number of excluded customers is small, the size of a header delivered can be reduced and the calculation amount of an operation that a customer needs to perform can be reduced to less than or equal to that of the method described in the fundamental technology. Hereinafter, main differences between the fundamental technology and this embodiment will be described while attention is paid to differences in individual phases. In addition, comparison is performed in terms of the header size and the amount of calculation necessary for decryption, by using specific examples of numeric values.

<Differences in Key Generation Phase>

First, differences in the key generation phase will be described. In the method of the fundamental technology, after various parameters are set in step S11 and step S13, customers are divided into A subgroups each including B customers in step S15. In this embodiment, similarly, various parameters are set in step S101 and S103, and customers are divided into X subgroups each including Y customers.

However, in this embodiment, further in step S105, a Y-ary tree structure where customers are assigned to leaves is constructed. Thus, A center secrets $\gamma_1, \ldots, \gamma_A$ used for integrating header elements for each subgroup and A public values $v1, \ldots, vA$ corresponding to such center secrets, where A represents the number of divisions of subgroups, are necessary in step S19 in the fundamental technology, whereas since subgroups can be formed for all the nodes except for leaves of the Y-ary tree constructed in step S105 in this embodiment, N values are necessary, where N represents the total number of nodes except for the leaves.

In addition, in the fundamental technology, a customer i belongs only to a subgroup S, which is represented by the expression below.

[Math. 27]

$$S_a \left( a = \left\lceil \frac{i}{B} \right\rceil \right)$$

Thus, the center secretly delivers to the customer i a private secret key:

$$d_i = g_b{}^{\gamma_a} = v_\alpha{}^{\alpha^b} \in G. \quad \text{[Math. 28]}$$

However, in this embodiment, after constructing a logical tree in step S105, each node of the logical tree can be used for reconstruction of subgroups in step S109. Thus, the customer i needs to belong to a plurality of subgroups constituted by all the nodes from a leaf assigned to the customer i to the root.

Thus, in step S115 in this embodiment, a plurality of private secret keys must be kept for the customer i. As described above, in the key generation phase, since a logical tree is constructed in this embodiment, the number of necessary parameters is slightly increased compared with the fundamental technology. However, in a case where no excluded customer exists or a case where the number of excluded customers is small, the header size of a header generated in the encryption phase described next can be reduced compared with the fundamental technology.

<Differences in Encryption Phase>

Next, the encryption phase will be described. In the fundamental technology, a session key is generated in step S31. After that, in step S33, non-excluded customers are selected for individual subgroups, and sets Sl (l=1, . . . , A) of customer indices in subgroups assigned to the individual customers are determined. After that, in step S35, header elements by which only non-excluded customers in individual subgroups can obtain a session key are calculated, and a header is configured. Thus, unless all the customers belonging to subgroups are excluded, header elements corresponding to all the subgroups must be calculated. Thus, the header size is maintained constant irrespective of whether the number r of excluded customers is large or small.

Meanwhile, in this embodiment, all the nodes from a leaf assigned to an excluded customer to a root are marked in step S301, and a set of node indices by which the non-excluded customer identifies a header element assigned to the non-excluded customer from a header h is set to S. After that, in step S303, a session key s is generated in accordance with a procedure as in the fundamental technology in step S303. In steps S305 to S325, header elements by which only customers who are assigned to unmarked nodes can acquire the session key s are calculated, and a header h is configured.

For more details, in step S317 in this embodiment, a header element for an unmarked node among nodes belonging to a Layer x is generated. This is an operation similar to the operation of step S35 in the fundamental technology. However, A header elements must be generated in step S35 in the fundamental technology since A subgroups already exist, whereas step S317 is performed only for a set of child nodes of a certain note in this embodiment and this process is repeated in steps S307 to S323.

Here, as shown in steps S315 to S319, for a node whose header element has been once generated, by marking all the nodes belonging to a subtree having the node as the vertex thereof, it is unnecessary to generate header elements corresponding to these nodes. Thus, an advantage occurs in that header elements for all the non-excluded customers including the node can be integrated together in a path. Thus, in a case where the number of excluded customers is small, a greater number of nodes can be integrated together. Thus, the header size can be reduced.

<Differences in Decryption Phase>

Finally, the decryption phase will be described. In the fundamental technology, in step S53, a non-excluded customer acquires a header element corresponding to a subgroup to which the customer belongs, and derives a session key by using the header element, a public key, and a private secret key. Meanwhile, in this embodiment, in step S503, a non-excluded customer acquires a header element corresponding to a parent node of a node included in S among nodes existing in a path extending from a leaf assigned to the customer to the root, and derives a session key by using the header element, a public key, and a private secret key.

This differs only in a corresponding header element and a private secret key used, and an operation as in the fundamental technology is performed. However, the calculation amount of an operation that a customer needs to perform in the decryption phase of the fundamental technology is 2PAIR+INV+(B−1−$r_a$)MUL, whereas the calculation amount in this embodiment is 2PAIR+INV+(Y−1−$r_a$)MUL.

<Comparison regarding Header Size and Calculation Amount>

In the fundamental technology, a set of customers is divided into A subgroups each having B customers, header elements corresponding to individual subgroups are generated, and all the header elements are collectively delivered as a header. Thus, the header size is always A+1, irrespective of whether the number r of excluded customers is large or small. This has an advantage in that the header size can be maintained constant, whereas this has a drawback in that the header size cannot be reduced, irrespective of the number of excluded customers. In the realistic content delivery system, capability of efficiently delivering content is required within a range in which the percentage of the number of excluded customers relative to the total number of customers is small. Thus, even if the method of the fundamental technology is used by placing greater emphasis on the security and convenience, a problem exists in that the redundancy of the header size at the time of delivery of content is increased.

In order to lessen the problem in the fundamental technology, reducing the header size itself by decreasing the number A of divisions of a set of customers can be conceived. However, in this case, a problem exists in that the value of B, which represents the number of customers belonging to a divided subgroup, is increased, and the value 2PAIR+INV+(B−1−$r_a$) MUL, which represents the calculation amount of an operation that each customer needs to perform, is increased.

Meanwhile, in this embodiment, as in the fundamental technology, a set of customers is divided into X subgroups each including Y customers. However, moreover, by adding some parameters, a Y-ary tree where individual customers in divided subgroups are set as leaves is constructed. Thus, although the header size is A+1 in the fundamental technology irrespective of whether or not an excluded customer exists, each customer belonging to a subgroup where no excluded customer exists can be regarded as a member of an upper Layer in a case where the root is defined as the uppermost layer. Consequently, a plurality of subgroups can be regarded as a subgroup, and the header size can be reduced. In addition, although the calculation amount of an operation that each customer needs to perform is represented as 2PAIR+INV+(Y−1−$r_a$)MUL as described above, the calculation amount can be reduced to less than or equal to that of the method of the fundamental technology by setting Y to B or less.

As described above with comparison with the fundamental technology, the present invention is one of content delivery methods using a public key. Compared with the fundamental technology, the present invention has the features described below.

First, in this embodiment, a logical tree is constructed by adding parameters to the method of the fundamental technology, and the added parameters are assigned to individual nodes of the logical tree.

Second, the key generation device, which serves as a center, delivers in advance to individual customers, information on the parameters assigned to the logical tree, as additional private secret keys.

Third, a deliverer of encrypted content operates the encryption device. In a case where a customer is excluded, the deliverer generates a header h in which exclusion has been performed for each node, as in a content delivery method using a common key.

Fourth, each customer operates a reception device to calculate a session key s from a public key PK, a header h, and a private secret key $d_i$ by using a method as in the fundamental technology.

Fifth, by configuring the method of the fundamental technology as in the above-mentioned first to fourth features, the amount of calculation necessary for decryption by a customer can be reduced to less than or equal to that in the method of the fundamental technology.

Sixth, by configuring the method of the fundamental technology as in the above-mentioned first to fourth features, in a case where the number of excluded customers is small, the header size can be reduced compared with the fundamental technology.

EXAMPLES

In order to describe advantages of this embodiment in more detail, comparison in terms of the header size and in terms of the amount of calculation necessary for decryption in a case where parameters n, A, B, X, and Y are set to small values will be shown as specific examples in FIGS. 23 to 26.

In the fundamental technology, it is recommended that the value of the number B of customers included in a divided subgroup relative to the number n of customers be set to B=(n)$^{1/2}$. Meanwhile, in this embodiment, by setting the number Y of branches of a logical tree, which is a parameter corresponding to B in the fundamental technology, to be less than or equal to B, efficiency can be increased in terms of the header size and the calculation amount.

Figure 23:
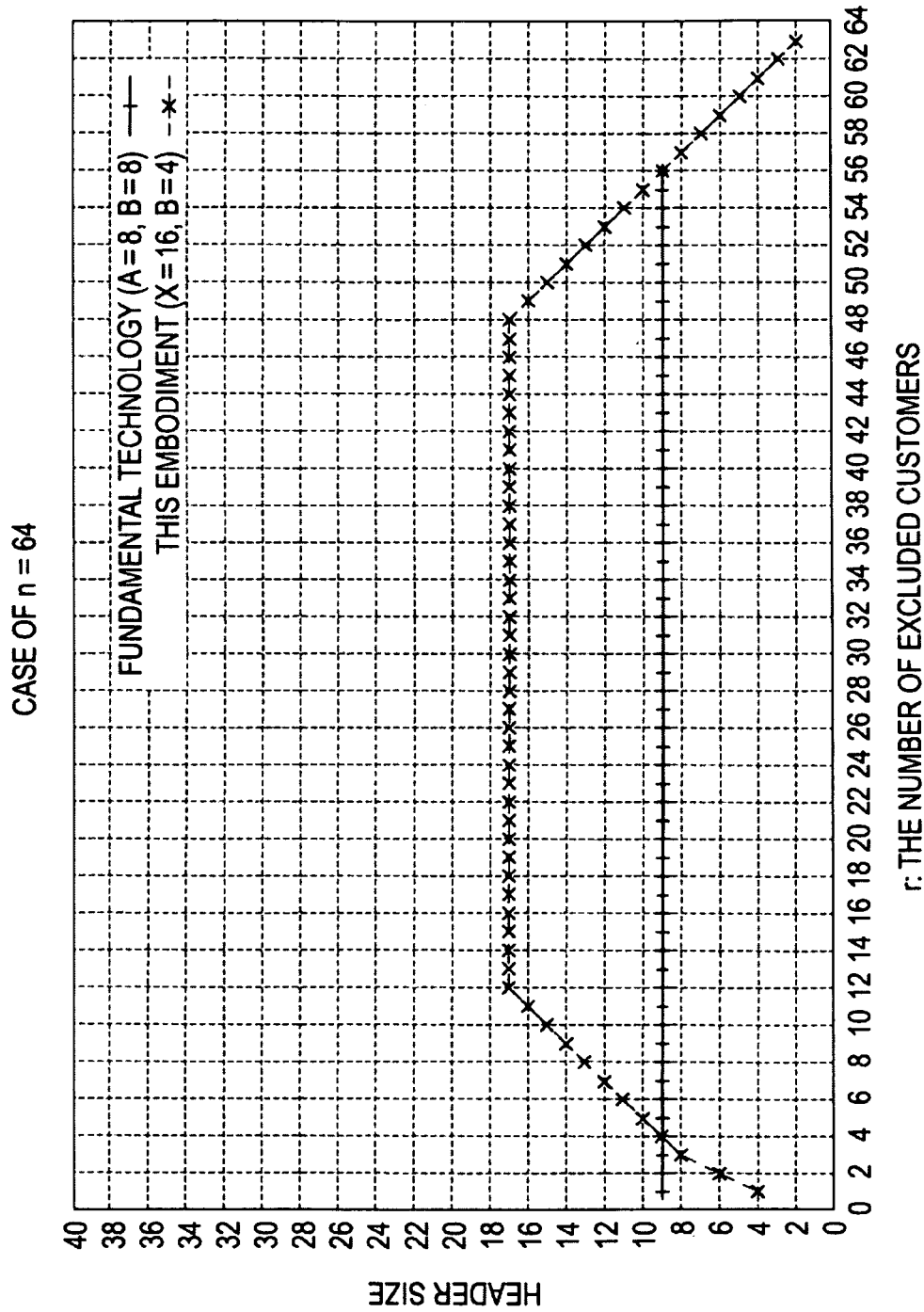
FIG. 23 is a graph in which comparison in terms of the header size of a header delivered to a customer is performed.
Figure 24:
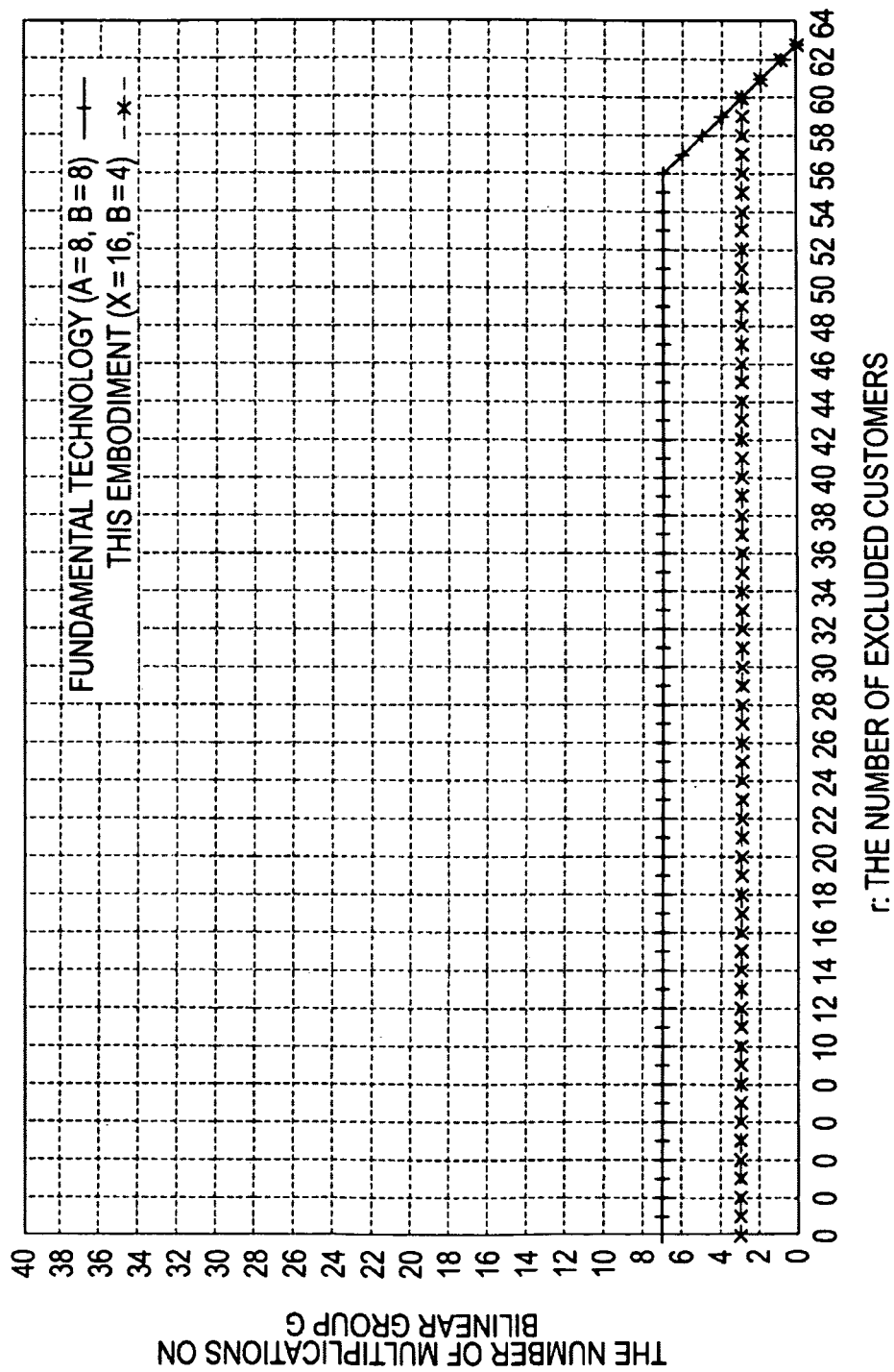
FIG. 24 is a graph in which comparison in terms of the number of multiplications on a bilinear group is performed.
Figure 25:
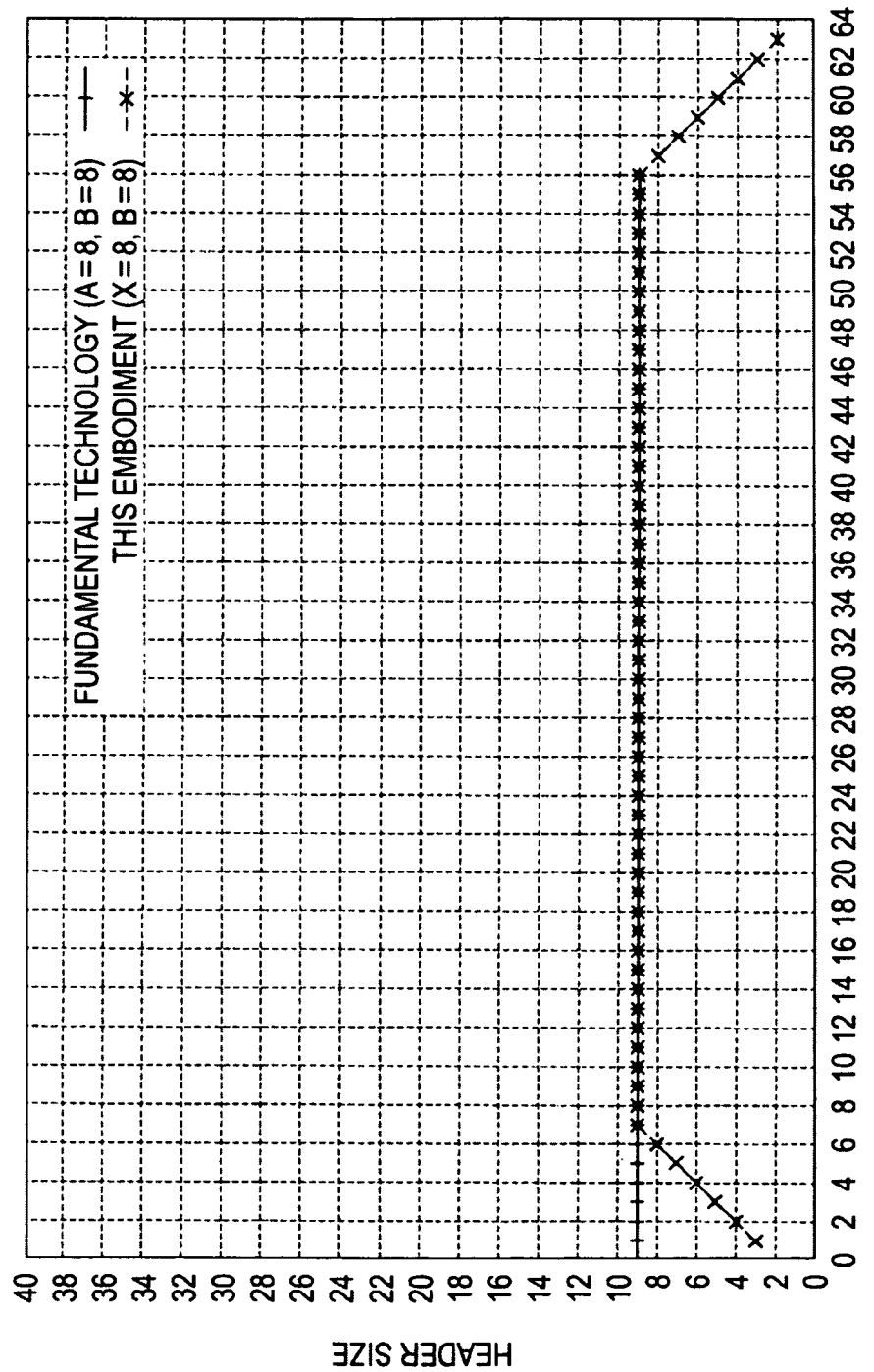
FIG. 25 is a graph in which comparison in terms of the header size of a header delivered to a customer is performed.
Figure 26:
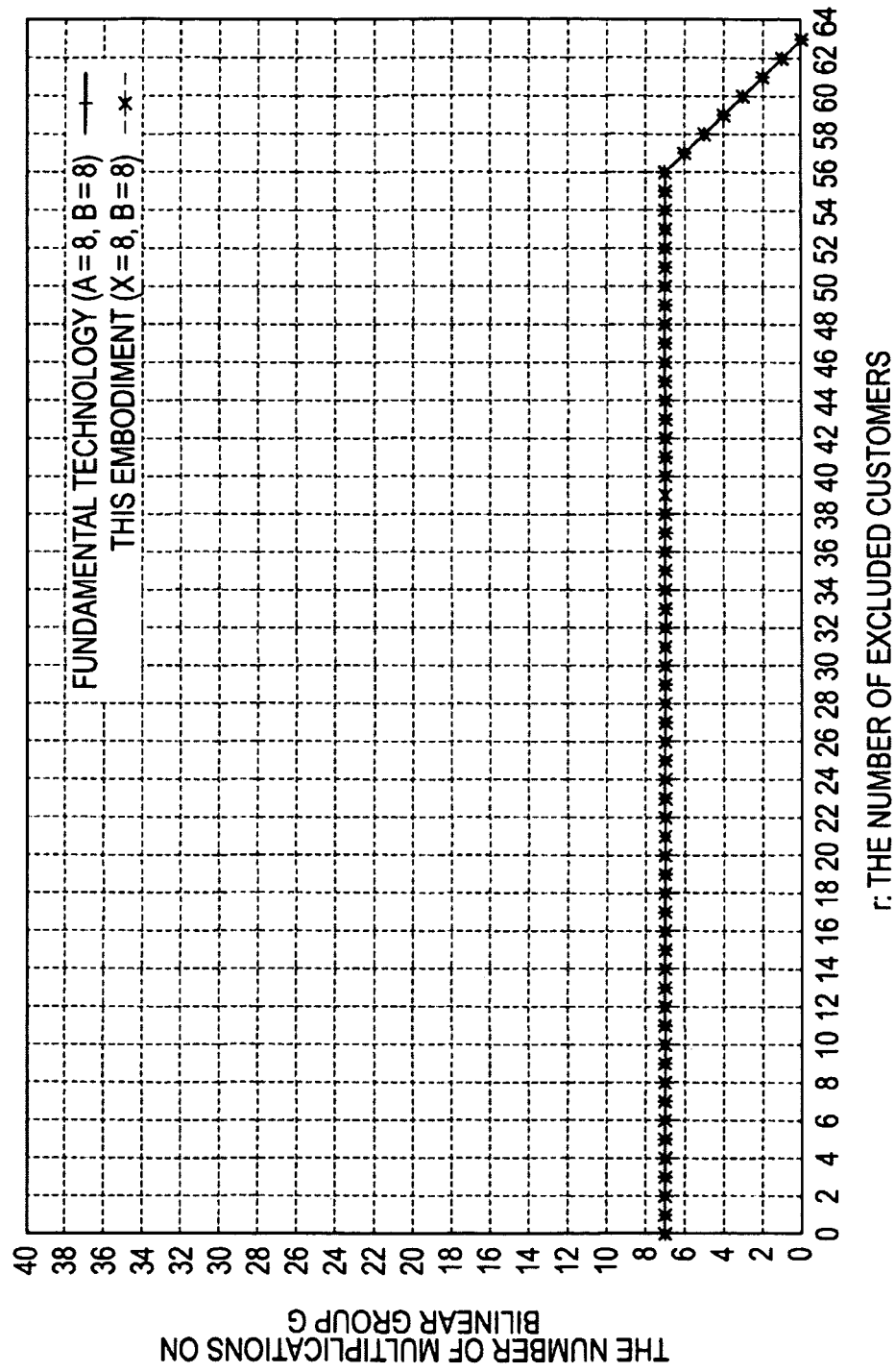
FIG. 26 is a graph in which comparison in terms of the number of multiplications on a bilinear group is performed.

Thus, in the below, for comparison, the numbers n of customers are set to the same, and Y<B is set. Comparisons between the fundamental technology and this embodiment in terms of the header size and in terms of the calculation amount of an operation necessary for decryption are shown in FIGS. 23 and 24, respectively. In addition, comparisons in terms of the header size and in terms of the amount of calculation necessary for decryption in a case where Y=B is set are shown in FIGS. 25 and 26, respectively.

As specific numeric values, in FIGS. 23 and 24, individual parameters in the method of the fundamental technology are set to n=64, A=8, and B=8, and individual parameters in this embodiment are set to n=64, X=16, and Y=4. In addition, in FIGS. 25 and 26, individual parameters are set to n=64, X=8, and B=Y=8. However, for simplification, bilinear groups used and the sizes of the bilinear groups are set to the same. (Regarding Case where Y<B is Set)

First, FIGS. 23 and 24 will be explained. The abscissa axis represents the number of excluded customers and the ordinate axis represents the header size (the total number of header elements) in FIG. 23. In addition, the abscissa axis represents the number of excluded customers and the ordinate axis represents the calculation amount of an operation necessary for decryption in FIG. 24. However, regarding the calculation amount of an operation necessary for decryption, since only a multiplication portion on a bilinear group G affects a difference between the fundamental technology and this embodiment, the ordinate axis in FIG. 24 represents the number of multiplications on the bilinear group G. In addition, a solid line represents the header size in the method of the fundamental technology and a broken line represents the header size in this embodiment in FIG. 23. In addition, a solid line represents the calculation amount in the method of the fundamental technology and a broken line represents the calculation amount in this embodiment in FIG. 24.

Regarding comparison in terms of the header size, as is clear from FIG. 23, in a case where the number r of excluded customers is smaller than 4, the header size in the method according to this embodiment is smaller than the header size in the method of the fundamental technology. That is, this case shows that even in a case where up to about six percent of the total customers are excluded, content can be delivered more efficiently in the method according to this embodiment.

Regarding comparison in terms of the amount of calculation necessary for decryption, as is clear from FIG. 24, in a case where the number r of excluded customers is smaller than 60, the amount of calculation in the method according to this embodiment is smaller than the amount of calculation in the method of the fundamental technology. This shows that content can be decrypted more efficiently in the method according to this embodiment. In addition, also in a case where the number of excluded customers exceeds 60, it can be seen that an amount of calculation equivalent to that in the method of the fundamental technology can be achieved. Thus, in a case where parameters are set as described above, when no excluded customer exists or the number of excluded customers is small, the method according to this embodiment is capable of achieving a reduced header size and achieving a reduced calculation amount of an operation that each customer needs to perform at the time of decryption, compared with the method according to the fundamental technology. Therefore, it can be said that the method according to this embodiment is capable of achieving efficient delivery of content, compared with the method according to the fundamental technology.

(Regarding Case where Y=B is Set)

Next, FIGS. 25 and 26 will be explained. Since only the values of X and Y in FIGS. 23 and 24 described above are changed in FIGS. 25 and 26, the abscissa and ordinate axes, solid lines, and broken lines in FIGS. 25 and 26 represent the same as those in FIGS. 23 and 24.

Regarding comparison in terms of the header size in a case where X=A=8 and Y=B=8 are set, as is clear from FIG. 25, in a case where the number r of excluded customers is smaller than seven, the header size in the method according to this embodiment is smaller than the header size in the method according to the fundamental technology. That is, this case shows that even in a case where up to about nine percent of the total customers are excluded, content can be delivered more efficiently in the method according to this embodiment. Also in a case where the number of excluded customers is equal to or greater than seven, a header size equivalent to that in the method of the fundamental technology can be achieved. Thus, irrespective of the number of excluded customers, the header size can be reduced to less than or equal to that in the method of the fundamental technology.

In addition, regarding comparison in terms of the amount of calculation necessary for decryption, as is clear from FIG. 26, irrespective of the number r of excluded customers, a calculation amount equivalent to that in the method of the fundamental technology can be achieved. Thus, in a case where individual parameters are set to X=A=8 and Y=B=8, it can be seen that when no excluded customer exists or the number of excluded customers is small, the header size can be reduced and only a calculation amount equivalent to that in the method of the fundamental technology is necessary for decryption.

As is clear from the above, by applying this embodiment, in a more realistic content delivery system, efficient content delivery can be realized compared with the fundamental technology, while convenience and security as in the fundamental technology are maintained.

As described above, the present invention is a method, in a content delivery system for securely delivering content by using a public key, for realizing a reduction in the amount of data to be delivered and a reduction in the amount of calculation necessary for decryption, compared with a conventional method. With implementation of the present invention, efficient content delivery can be achieved compared with a conventional content delivery method using a public key.

In the above, a preferred embodiment of the present invention has been described with reference to the attached drawings. However, needless to say, the present invention is not limited to such an example. It is obvious that a person skilled in the art can conceive various changes or modifications within the scope described in the claims, and it should be understood that the various changes or modifications naturally fall within the technical scope of the present invention.

For example, although the above-mentioned tree-structure construction unit 231 assumes a tree structure where branches grow from top to bottom, the three structure is not necessarily limited to this. A tree structure where branches grow from bottom to top, from left to right, or from right to left may be provided.

In addition, individual steps in each flowchart in this specification are not necessarily processed in a time-series manner in accordance with the order described as a flowchart. The individual steps may include processes performed in parallel or individually (for example, parallel processes or object-based processes).

The invention claimed is:

1. A key generation device characterized by comprising:
a tree-structure construction unit that hierarchically constructs a Y-ary tree structure where n reception devices are assigned to leaves, Y is the number of branches, and a height is represented by ($\log_Y n$), and forms subgroups constituted by a plurality of leaves existing in a layer lower than intermediate nodes existing between the leaves and a root;
a leaf-key assigning unit that assigns leaf keys $g_y$ to the individual leaves and the individual intermediate nodes;
a parameter assigning unit that assigns different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and
a key calculation unit that identifies paths extending from the root to the leaves, and calculates keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

2. The key generation device according to claim 1, characterized by further comprising a delivery unit that delivers sets of keys in the paths calculated by the key calculation unit to the respective reception devices.

3. The key generation device according to claim 1, characterized by further comprising:
a random-number determination unit that selects, at random, a prime p to determine a bilinear group G having the prime p as an order, selects, at random, g serving as a generator of G, and selects, at random, a secret random number α (α is an integer),
wherein the leaf-key assigning unit calculates the leaf keys $g_y$ that satisfy expression A below:

$$g_y = g^{(\alpha)^y} \quad \text{(Expression A)}$$

(y=1, 2, ..., Y, Y+2, ..., 2Y).

4. The key generation device according to claim 3, characterized in that the parameter assigning unit selects, at random, for the root and all the individual nodes except for the leaves, the node parameters $\gamma_{x,y}$ ($\gamma_{x,y}$ is an integer), and calculates the parameters $v_{x,y}$ represented by expression B below:

$$v_{x,y} = g^{(\gamma_{x,y})} \quad \text{(Expression B).}$$

5. The key generation device according to claim 4, characterized in that the key calculation unit sets, as secret keys, values obtained by raising the leaf keys $g_y$ assigned to the intermediate nodes or the leaves to the power of the parameters $\gamma_{x,y}$ assigned to parent nodes of the intermediate nodes or the leaves.

6. The key generation device according to claim 5, characterized in that:
the key calculation unit calculates a public key on the basis of the leaf keys $g_y$ and the parameters $v_{x,y}$; and
the delivery unit includes a public-key publishing part that publishes the public key.

7. The key generation device according to claim 5, characterized in that the delivery unit further includes a transmission part that transmits the secret keys calculated by the key calculation unit to the respective reception devices.

8. An encryption device characterized by comprising:
an identification unit that identifies an excluded reception device among n reception devices, and determines a set S of non-excluded reception devices;
and a session key determination unit that determines a session key, calculates header-elements corresponding to reception devices, and generates a header from the header-elements while excluding from the header a header-element corresponding to the excluded reception device,
wherein each reception device comprises: a reception unit that receives keys obtained by a key generation device that hierarchically constructs a Y-ary tree structure where n reception devices are assigned to leaves, Y is the number of branches, and a height is represented by ($\log_y n$), forms subgroups constituted by a plurality of leaves existing in a layer lower than intermediate nodes existing between the leaves and a root, assigns leaf keys $g_y$ to the individual leaves and the individual intermediate nodes, assigns different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifies paths extending from the root to the leaves, and calculates the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

9. The encryption device according to claim 8, wherein the session-key determination unit selects, at random, an integer t, and determines a session key $s=e(g_y,g_1)^t$, where $e(g_y,g_1)$ represents a bilinear map for two elements $g_Y$ and $g_1$ of a bilinear group.

10. The encryption device according to claim 9, characterized by further comprising an encryption unit that encrypts, by using the session key s, content to be delivered.

11. The encryption device according to claim 9, characterized in that in a hierarchized tree structure, the session-key determination unit further includes a header-element calculation part that marks all the individual nodes existing in a path extending from a leaf to which the excluded reception device is assigned to the root, and calculates, on the basis of the parameters $v_{x,y}$ assigned to the marked nodes and leaf keys $g_y$ assigned to intermediate nodes for which the marked nodes serve as parent nodes, $c_{x,y}$ represented by expression C below:

$$c_{x,y} = \left(v_{x,y} \cdot \prod_{j \in S_{x,y}} g_{Y+1-j}\right)^t, \quad \text{(Expression C)}$$

where $S_{x,y}$ represents a set of unmarked child nodes belonging to each of subgroups where the marked nodes serve as parent nodes.

12. The encryption device according to claim 11, characterized in that the session-key determination unit further includes a header information generation part that generates the header by setting the header-elements $c_{x,y}$ and a random number $g^t$ obtained by the header-element calculation part as header information.

13. A reception device in communication with the key generation device of claim 1, the reception device characterized by comprising:
a reception unit that receives keys calculated by the key calculation unit of the key generation device.

14. The reception device according to claim 13, characterized by further comprising a decryption unit that decrypts encrypted content by using a session key s.

15. The reception device according to claim 14, characterized in that:
the reception unit further receives information on a set S of non-excluded reception devices, which is information for identifying an excluded reception device; and
the reception device further comprises a determination unit that determines whether or not the reception device is included in the set S.

16. The reception device according to claim 14, characterized in that in a case where the determination unit determines that the reception device is included in the set S, the decryption unit decrypts the encrypted content by calculating the session key s on the basis of expression D shown below and using the calculated session key s:

$$s = \frac{e(g_{i_{x'}}, c_{x,y})}{e\left(g_{i_{x'}}^{\gamma_{i_{x'}}-1} \cdot \prod_{\substack{j \in S_{x,y} \\ j \neq i_{x'}}} g_{Y+1-j+i_{x'}}, g^t\right)}. \quad \text{(Expression D)}$$

17. A cryptographic key generation method characterized by comprising:
a tree-structure construction step of hierarchically constructing a Y-ary tree structure where n reception devices are assigned to leaves, Y is the number of branches, and a height is represented by ($\log_y n$), and forming subgroups constituted by a plurality of leaves existing in a layer lower than intermediate nodes existing between the leaves and a root;
a leaf-key assigning step of assigning leaf keys $g_y$ to the individual leaves and the individual intermediate nodes;
a parameter assigning step of assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and
a cryptographic key calculation step of identifying paths extending from the root to the leaves, and calculating cryptographic keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

18. A computer-implemented encryption method comprising:
identifying an excluded reception device among n reception devices;
determining a set S of non-excluded reception devices;
calculating, by a processor, header-elements corresponding to reception devices; and
generating a header from the header-elements while excluding from the header a header-element corresponding to the excluded reception device,
wherein each reception device comprises: a reception unit that receives keys obtained by a key generation device that hierarchically constructs a Y-ary tree structure where n reception devices are assigned to leaves, Y is the number of branches, and a height is represented by ($\log_y n$), forms subgroups constituted by a plurality of leaves existing in a layer lower than intermediate nodes existing between the leaves and a root, assigns leaf keys $g_y$ to the individual leaves and the individual intermediate nodes, assigns different parameters $v_{x,y}$ (x: layer, y:

1, 2, ..., $Y^x$) and node parameters $\gamma_{x,y}$ (x: layer, y: 1, 2, ..., $Y^x$) to the individual intermediate nodes and the root, identifies paths extending from the root to the leaves, and calculates the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

19. A cryptographic key processing method characterized by comprising steps of receiving cryptographic keys obtained by hierarchically constructing a Y-ary tree structure where n reception devices are assigned to leaves, Y is the number of branches, and a height is represented by ($\log_Y n$), forming subgroups constituted by a plurality of leaves existing in a layer lower than intermediate nodes existing between the leaves and a root, assigning leaf keys $g_y$ to the individual leaves and the individual intermediate nodes, assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifying paths extending from the root to the leaves, and calculating the cryptographic keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

20. A non-transitory computer-readable medium storing a program that, when executed by a computer, causes the computer to realize:
 a tree-structure construction function of hierarchically constructing a Y-ary tree structure where n reception devices are assigned to leaves, Y is the number of branches, and a height is represented by ($\log_Y n$), and forming subgroups constituted by a plurality of leaves existing in a layer lower than intermediate nodes existing between the leaves and a root;
 a leaf-key assigning function of assigning leaf keys $g_y$ to the individual leaves and the individual intermediate nodes;
 a parameter assigning function of assigning different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root; and
 a key calculation function of identifying paths extending from the root to the leaves, and calculating keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

21. A non-transitory computer-readable medium storing a program that, when executed by a computer, causes the computer to:
 identify an excluded reception device among n reception devices;
 determine a set S of non-excluded reception devices;
 calculate header-elements corresponding to reception devices; and
 generate a header from the header-elements while excluding from the header a header-element corresponding to the excluded reception device,
 wherein each reception device comprises: a reception unit that receives keys obtained by a key generation device that hierarchically constructs a Y-ary tree structure where n reception devices are assigned to leaves, Y is the number of branches, and a height is represented by ($\log_Y n$), forms subgroups constituted by a plurality of leaves existing in a layer lower than intermediate nodes existing between the leaves and a root, assigns leaf keys $g_y$ to the individual leaves and the individual intermediate nodes, assigns different parameters $v_{x,y}$ (x: layer, y: 1, 2, ..., $Y^x$) and node parameters $\gamma_{x,y}$ (x: layer, y: 1, 2, ..., $Y^x$) to the individual intermediate nodes and the root, identifies paths extending from the root to the leaves, and calculates the keys on the basis of the leaf keys $g_y$ assigned to the intermediate nodes or the leaves existing in the paths and the parameters $v_{x,y}$ and the node parameters $\gamma_{x,y}$ assigned to parent nodes of the intermediate nodes or the leaves.

22. The non-transitory computer-readable medium of claim 20, wherein the program, when executed by a computer, further causes the computer to realize a reception function of receiving keys calculated by the key calculation function.

* * * * *